(12) United States Patent
Bushell et al.

(10) Patent No.: US 7,639,874 B2
(45) Date of Patent: Dec. 29, 2009

(54) METHODS FOR DISCRIMINATING MOVING OBJECTS IN MOTION IMAGE SEQUENCES

(75) Inventors: Steven Joseph Bushell, Cranston, RI (US); Bruce Allen Maxwell, Springfield, PA (US); Richard Mark Friedhoff, New York, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 491 days.

(21) Appl. No.: 11/498,621

(22) Filed: Aug. 3, 2006

(65) Prior Publication Data
US 2008/0031526 A1   Feb. 7, 2008

(51) Int. Cl.
G06K 9/38 (2006.01)
G06K 9/00 (2006.01)

(52) U.S. Cl. .................... 382/173; 382/128; 382/162; 382/224; 348/169

(58) Field of Classification Search ............. 382/103, 382/128–131, 162, 164, 171, 173, 180, 181, 382/224–225; 348/169–172
See application file for complete search history.

(56) References Cited

U.S. PATENT DOCUMENTS

| | | | | |
|---|---|---|---|---|
| 5,134,472 A * | 7/1992 | Abe | ........................... | 348/700 |
| 5,214,744 A * | 5/1993 | Schweizer et al. | .......... | 382/103 |
| 5,243,418 A * | 9/1993 | Kuno et al. | ................. | 348/155 |
| 5,280,530 A * | 1/1994 | Trew et al. | ................... | 382/103 |
| 5,706,417 A | 1/1998 | Adelson | ...................... | 395/129 |
| 5,963,272 A | 10/1999 | Wixson | ...................... | 348/700 |
| 6,035,067 A | 3/2000 | Ponticos | ..................... | 382/226 |
| 6,037,976 A | 3/2000 | Wixson | ...................... | 348/122 |
| 6,191,812 B1 * | 2/2001 | Tzidon et al. | ............... | 348/140 |
| 6,263,088 B1 * | 7/2001 | Crabtree et al. | ............. | 382/103 |
| 6,295,367 B1 * | 9/2001 | Crabtree et al. | ............. | 382/103 |
| 6,445,409 B1 * | 9/2002 | Ito et al. | ..................... | 348/155 |
| 6,591,006 B1 * | 7/2003 | Niemann | ..................... | 382/162 |
| 6,668,078 B1 * | 12/2003 | Bolle et al. | ................. | 382/164 |
| 6,711,279 B1 * | 3/2004 | Hamza et al. | ............... | 382/103 |
| 6,985,172 B1 * | 1/2006 | Rigney et al. | ............... | 348/149 |
| 7,415,164 B2 * | 8/2008 | Wren et al. | .................. | 382/280 |
| 2006/0177149 A1 | 8/2006 | Friedhoff et al. | ............ | 383/274 |

OTHER PUBLICATIONS

Comaniciu, D. and Meer, P. "Mean Shift Analysis and Applications," *The Proceedings of the Seventh IEEE International Conference on Computer Vision*. Sep. 20-27, 1999: vol. 2, pp. 1197 to 1203.

(Continued)

*Primary Examiner*—Manav Seth
(74) *Attorney, Agent, or Firm*—Davidson, Davidson & Kappel, LLC; Felix L. D'Arienzo, Jr.

(57) ABSTRACT

In an exemplary embodiment of the present invention, an automated, computerized method is provided for classifying pixel values in a motion sequence of images. According to a feature of the present invention, the method comprises the steps of determining spectral information relevant to the sequence of images, and utilizing the spectral information to classify a pixel as one of background, shadow and object.

13 Claims, 29 Drawing Sheets

OTHER PUBLICATIONS

Rousseew, P. J. "Least Median Squares of Regression," *Journal of American Statistical Association*. Dec. 1984: vol. 79, No. 388, pp. 871 to 880.

Stauffer, C. and Grimson, W. "Adaptive Background Mixture Models for Real Time Tracking," *The Proceedings of the Seventh IEEE International Conference on Computer Vision and Pattern Recognition*. Jun. 1999: vol. 2, pp. 246-252.

Mattas, J., Marik, R., and Kittler, J. "On Represemtation and Matching of Multi-Coloured Objects," *The Proceedings of the Fifth IEEE International Conference on Computer Vision*. Jun. 20-23, 1995: pp. 726 to 732.

Bakowski, A. and Jones, G. A. "Video Surveillance Tracking Using Colour Adjaceny Graphs," *IEEE International Conference on Image Processing and Its Applications*. Jul. 12-15, 1999: vol. 2, pp. 794 to 798.

* cited by examiner

| | Background material in direct plus ambient illumination |
| | Background material in ambient illumination only |
| | Material 1 from Object 1 in direct plus ambient illumination |
| | Material 2 from Object 2 in direct plus ambient illumination |
| | Material 3 from Object 3 in direct plus ambient illumination |
| | Material 4 from Object 4 in direct plus ambient illumination |

# METHODS FOR DISCRIMINATING MOVING OBJECTS IN MOTION IMAGE SEQUENCES

BACKGROUND OF THE INVENTION

Many significant and commercially important uses of modern computer technology relate to images. These include image processing, image analysis and computer vision applications. The ability of a computer to correctly and accurately distinguish between a shadow and a material object within an image has been a persistent challenge to scientists. This is particularly important in connection with object recognition and tracking in motion image sequences. For example, a video camera fixed for observation of a field of view, for detection of the appearance and motion of certain objects of interest, can be coupled to a computer for analysis of the image sequence recorded by the camera. It is a reasonably straightforward task for the computer to distinguish background elements of the image (forming the unobstructed field of view) from changes in subsequent recorded images of the field of view. A difficulty is determining whether differences detected in subsequent image recordings are the result of moving objects, or are due to changes in the illumination flux radiating the field of view, for example, a shadow caused by the object.

If a cast shadow is indistinguishable from the object casting the shadow, it would not be possible for the computer to recognize the object. Thus, the ability of a computer to recognize a specific object moving within a preselected field of view being surveyed by a video camera is an important design consideration. Accordingly, there is a persistent need for the development of accurate and correct techniques that can be utilized in the operation of computers relating to images.

SUMMARY OF THE INVENTION

The present invention provides a method and system comprising image techniques that accurately and correctly reflect and represent physical phenomena occurring in the visual world, and more specifically, techniques which can be utilized to identify a moving object within a field of view.

In a first exemplary embodiment of the present invention, an automated, computerized method is provided for classifying pixel values in a motion sequence of images. According to a feature of the present invention, the method comprises the steps of determining spectral information relevant to the sequence of images, and utilizing the spectral information to classify a pixel as one of background, shadow and object.

In a second exemplary embodiment of the present invention, an automated, computerized method is provided for tracking an object in a motion sequence of images. According to a feature of the present invention, the method comprises the steps of determining motion pixels from the motion sequence of images, calculating second order tokens as a function of the motion pixels, and identifying motion of an object as a function of the second order tokens.

In a third exemplary embodiment of the present invention, a computer system comprises a CPU and a memory storing a sequence of images, the CPU is arranged and configured to execute a routine to determine spectral information relevant to the sequence of images, and utilize the spectral information to classify a pixel as one of background, shadow and object.

In a fourth exemplary embodiment of the present invention, a computer system comprises a CPU and a memory storing a motion sequence of images, the CPU is arranged and configured to execute a routine to determine motion pixels from the motion sequence of images, calculate second order tokens as a function of the motion pixels and identify motion of an object as a function of the second order tokens.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programmed to carry out the steps of the methods of the present invention.

BRIEF DESCRIPTION OF THE DRAWINGS

FIG. 9b is a flow chart of a method for creating an Nth order token for use in the routine of FIG. 9a.

DETAILED DESCRIPTION OF THE PREFERRED EMBODIMENTS

Figure 1:
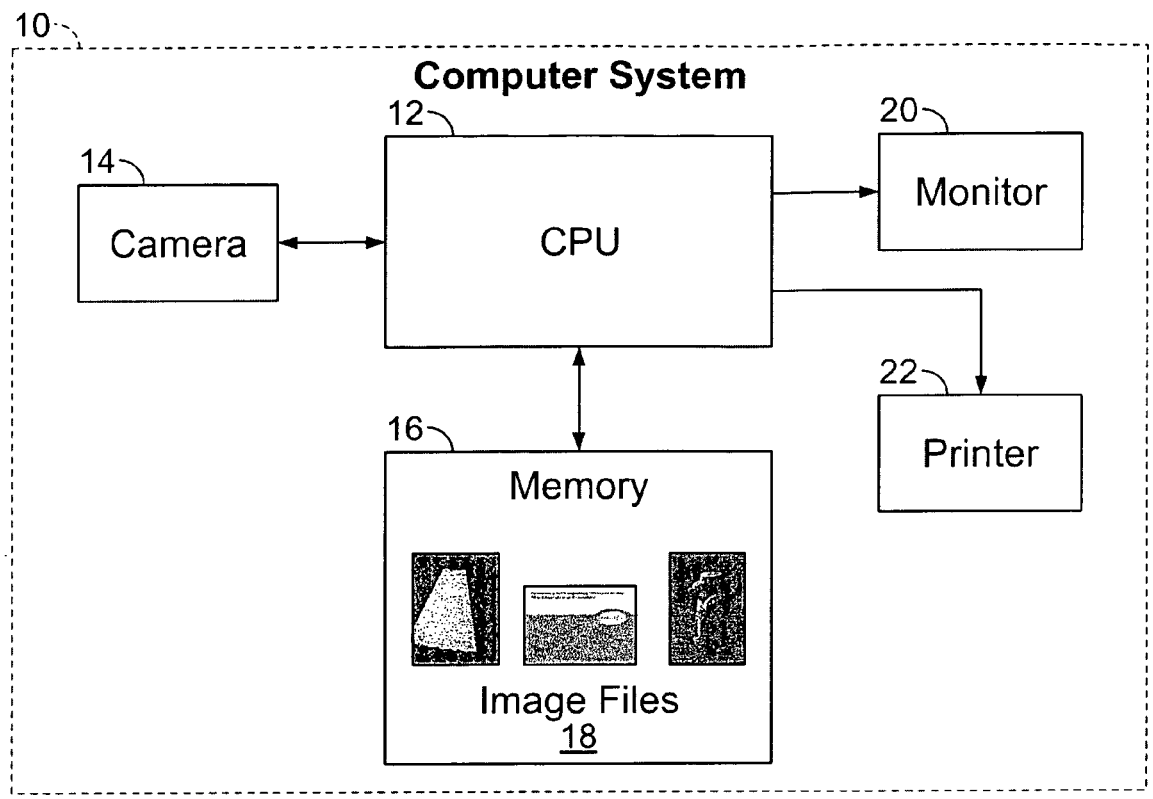
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital video camera 14 via, for example, a USB port. The digital video camera 14 operates to download a sequence of images sensed by the camera 14 of a preselected field of view, to the CPU 12. The CPU 12 stores the downloaded images in a memory 16 as image files 18. The image files 18 can be accessed by the CPU 12 for display in a sequence, on a monitor 20, or for print out, one at a time, on a printer 22.

Figure 2:
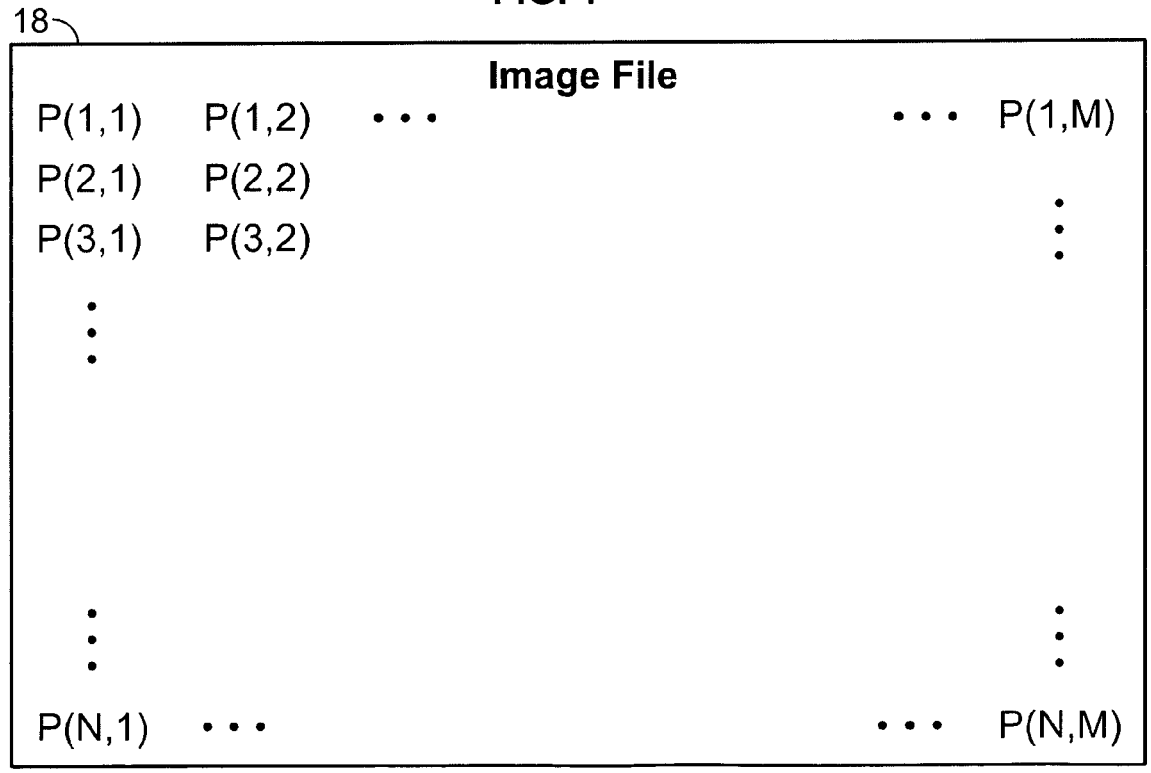
FIG. 2 shows an n×m pixel array image file for one frame of a sequence of frames of a motion image stored, in the computer system of FIG. 1.

As shown in FIG. 2, each image file 18 comprises an n×m pixel array and corresponds to a frame of a sequence of frames recorded by the video camera 14. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes m columns of n rows each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known. The display on the monitor 20 of a sequence of image files 18 provides a display of events within the field of view, as recorded by the video camera 14.

In an image operation, the CPU 12 operates to analyze the RGB values of the pixels of each of a sequence of stored image files 18 to achieve various objectives, such as, for example, the detection and identification of an object moving through the preselected field of view recorded by the video camera 14 in the sequence of images. In one example, the image operation can be performed by the CPU 12 in connection with discriminating moving objects from shadows in sequence with a static background image. This can be, for example, a security camera mounted indoors, with a fixed field of view, and constant or slowly varying lighting. Or, in another example, the CPU 12 can analyze sequences of images with highly variable illumination, as in the instance of a video camera 14 mounted in an outdoor setting. In either case, the CPU 12 utilizes spectral information to classify pixels of the scene in a determination of the presence of objects.

As taught in co-pending application Ser. No. 11/341,742, filed on Jan. 27, 2006, entitled: "Method and System For Identifying Illumination Flux In An Image," which is hereby incorporated by reference, an image comprises two components, material and illumination. Moreover, as further taught in the co-pending Application, an illumination flux impinging on a material depicted in an image is a bi-illuminant flux which comprises an ambient illuminant and a direct or incident illuminant. The incident illuminant is light that causes a shadow and is found outside a shadow perimeter. The ambient illuminant is light present on both the bright and dark sides of a shadow, but is more perceptible within the dark region of a shadow.

Spectra for the incident illuminant and the ambient illuminant can be different from one another. A spectral shift caused by a shadow, i.e., a decrease of the intensity of the incident illuminant, will be substantially invariant over different materials present in a scene depicted in an image when the scene is illuminated by a common illumination flux. Thus, the spectral shift caused by a shadow can be expressed by a spectral ratio of colors across an illumination boundary defined by a shadow on a material. Inasmuch as an illumination boundary is caused by the interplay between the incident illuminant and the ambient illuminant, spectral ratios throughout the image that are associated with illumination change (illuminant ratios), should be consistently and approximately equal, regardless of the color of the bright side or the material object characteristics of the boundary. A characteristic spectral ratio for a particular image or scene within an image, is a spectral ratio associated with illumination change caused by a shadow, as occurs in the particular image, and can be used to determine if a particular boundary in a scene is caused by a shadow or an object. This information can be utilized to classify pixels of a time sequence of images to detect moving objects.

An exemplary characteristic spectral ratio of an image can be expressed by the equation: S=Dark/(Bright−Dark), wherein Dark is a sensor reading of a color of a material depicted in the image, in shadow, and Bright is the sensor reading for the color of that same material when fully lit by the incident illuminant. In a preferred embodiment of the present invention, the spectral ratio S=Dark/(Bright−Dark) is utilized because it has been discovered during development of the present invention that the normalized value for the ratio Dark/(Bright−Dark) is invariant across different geometric orientations for a material object, and thus, the ratio remains constant across illumination boundaries for objects at different orientations. Moreover, the normalized value for the ratio Dark/(Bright−Dark) produced by a fully shadowed pixel and a penumbra pixel will be the same as the normalized value produced by a fully shadowed pixel and a fully lit pixel. These relationships are not exhibited by the normalized values of Bright/Dark and Bright/(Bright−Dark). Accordingly, the ratio Dark/(Bright−Dark) and the normalized value thereof, provide the optimum combination of accuracy and correctness.

Figure 3A:
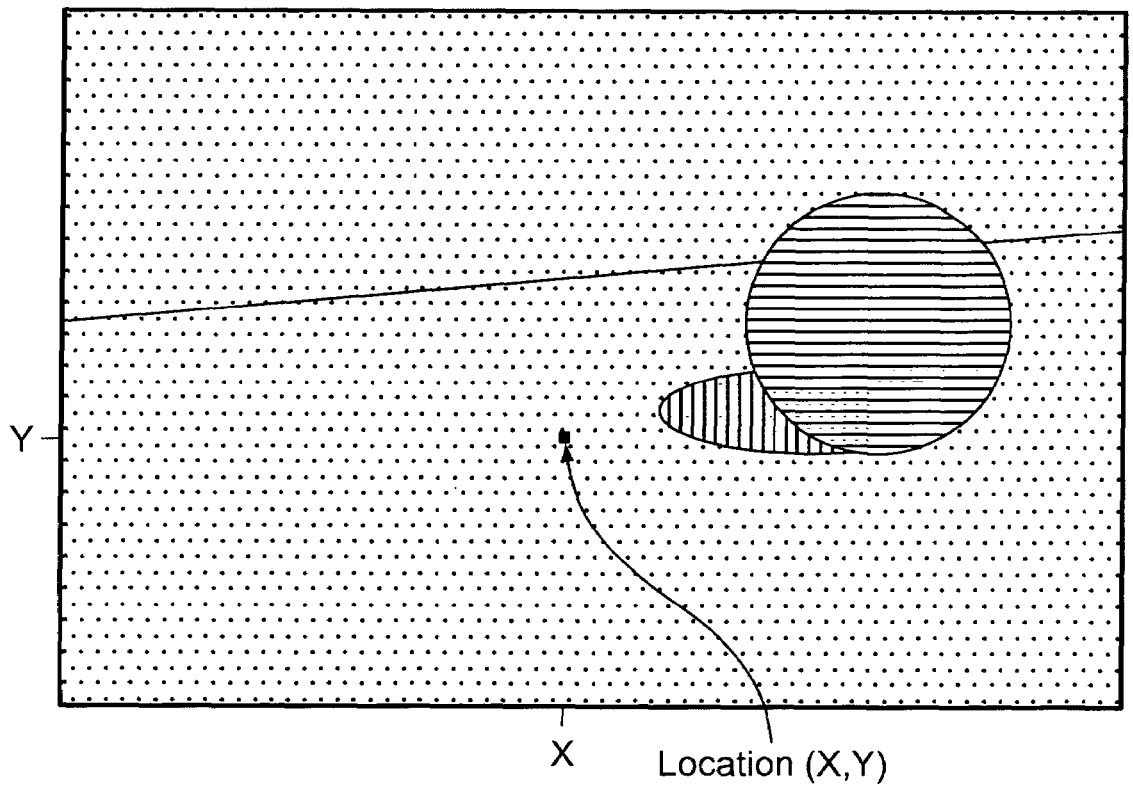
FIGS. 3a-e depict a sample image sequence illustrating an object moving through a static background field of view.
Figure 3B:
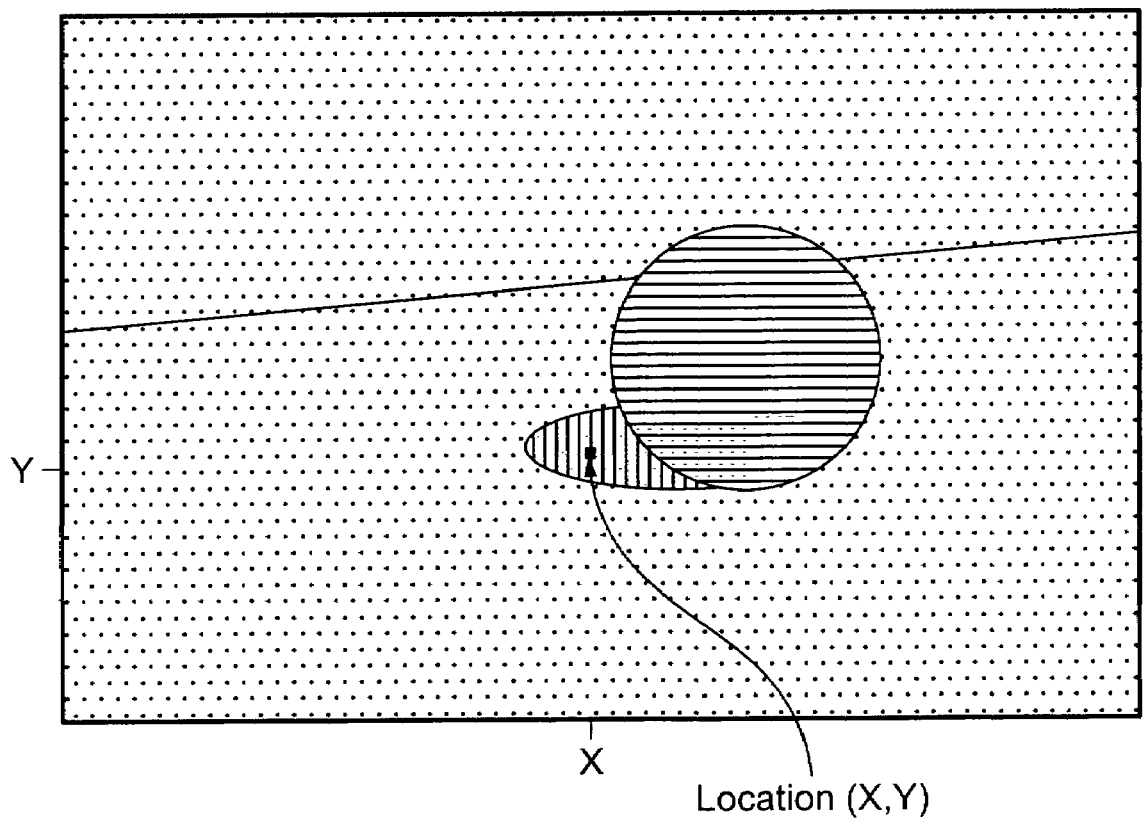
Figure 3C:
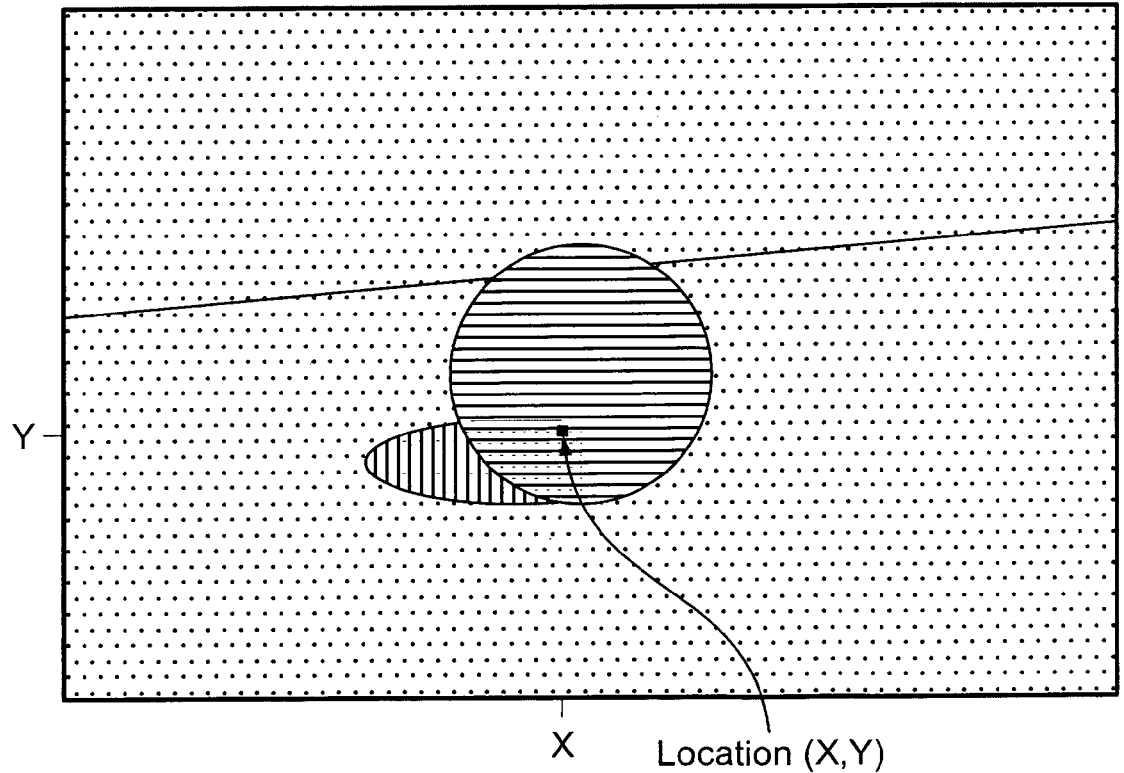
Figure 3D:
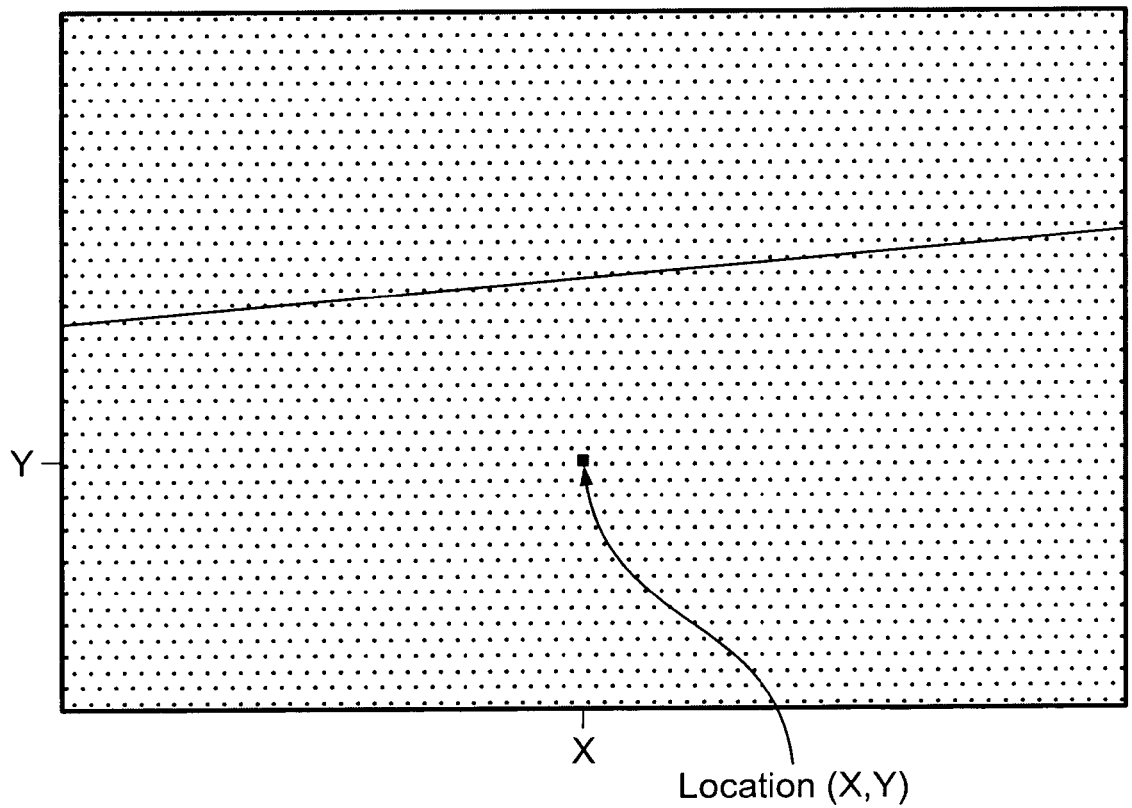
Figure 3E:
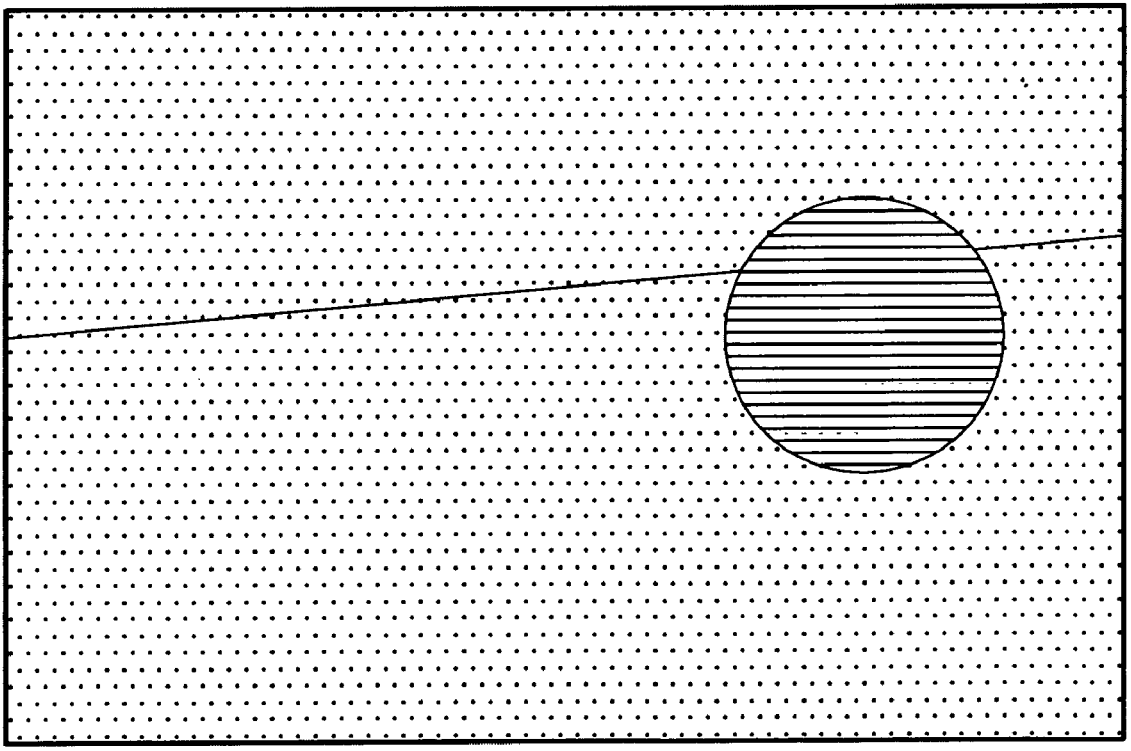

Referring now to FIGS. 3a-e, there is shown a sample image sequence illustrating an object moving through a static background field of view illuminated by constant bi-illuminant conditions (incident or direct illuminant and ambient illuminant), as may occur, for example, with a security camera mounted for monitoring a fixed field of view, and constant lighting. The sequence illustrated in FIGS. 3a-c can correspond to a sequence of image files 18, stored by the CPU 12 from images of a scene recorded by the video camera 14. They illustrate a ball moving across the static background of the field of view. The sample image sequence shows a ball and its shadow moving across a background under bi-illuminant conditions. The most common pixel values at each location define the static background image. FIG. 3d corresponds to a depiction of the static background of the field of view, determined by the CPU 12 from the images of FIGS. 3a-c, as will be described. According to a feature of the present invention, the normalized characteristic spectral ratio for the static background depicted in FIG. 3d provides a basis for analyzing each individual pixel of each image file 18 of the sequence, as represented by FIGS. 3a-c, to determine whether an individual pixel of a particular image file 18 is a background pixel, a pixel from a moving object, such as the ball of the example of FIGS. 3a-c, or a shadow pixel. FIG. 3e depicts an image of the ball without a shadow, as can be generated by the CPU 12 upon analysis of the images of FIGS. 3a-c, as will appear. For example, FIG. 3a is redrawn by replacing the pixels identified as shadow with static background pixels from the same location. Thus only the moving object and the static background image remain, greatly simplifying the tracking of the moving object, in this case the ball.

As shown in FIG. 3a, a location (X, Y) at a first time represents the static background, and pixels at this location will equal the value of pixels from the static background represented by FIG. 3d. At a second time, depicted in FIG. 3b, the location (X, Y) falls within a shadow cast by the moving ball, as the ball moves across the field of view. The normalized spectral ratio between the current pixel at location (X,Y) and the static background pixel at location (X,Y) matches the scene normalized spectral ratio, and so the pixel is recognized as being a shadow. At a third time, depicted in FIG. 3c, the location (X,Y) falls within the ball object moving through the scene. The normalized spectral ratio between the current pixel at location (X,Y), and the static background pixel at location (X,Y) does not match the scene normalized spectral ratio, and so the pixel is recognized as being a distinct material from a moving object. FIG. 3d shows the static background image calculated from the three frames of FIGS. 3a-c. The sample image sequence shows a ball and its shadow moving across a background under bi-illuminant conditions. The most common pixel values at each location define the static background image. The pixel values at location (X,Y) represent the static background image. The static background image is used with the scene normalized spectral ratio to classify pixels that change from frame to frame as either background pixels, shadow pixels, or pixels from moving objects.

Figure 4A:
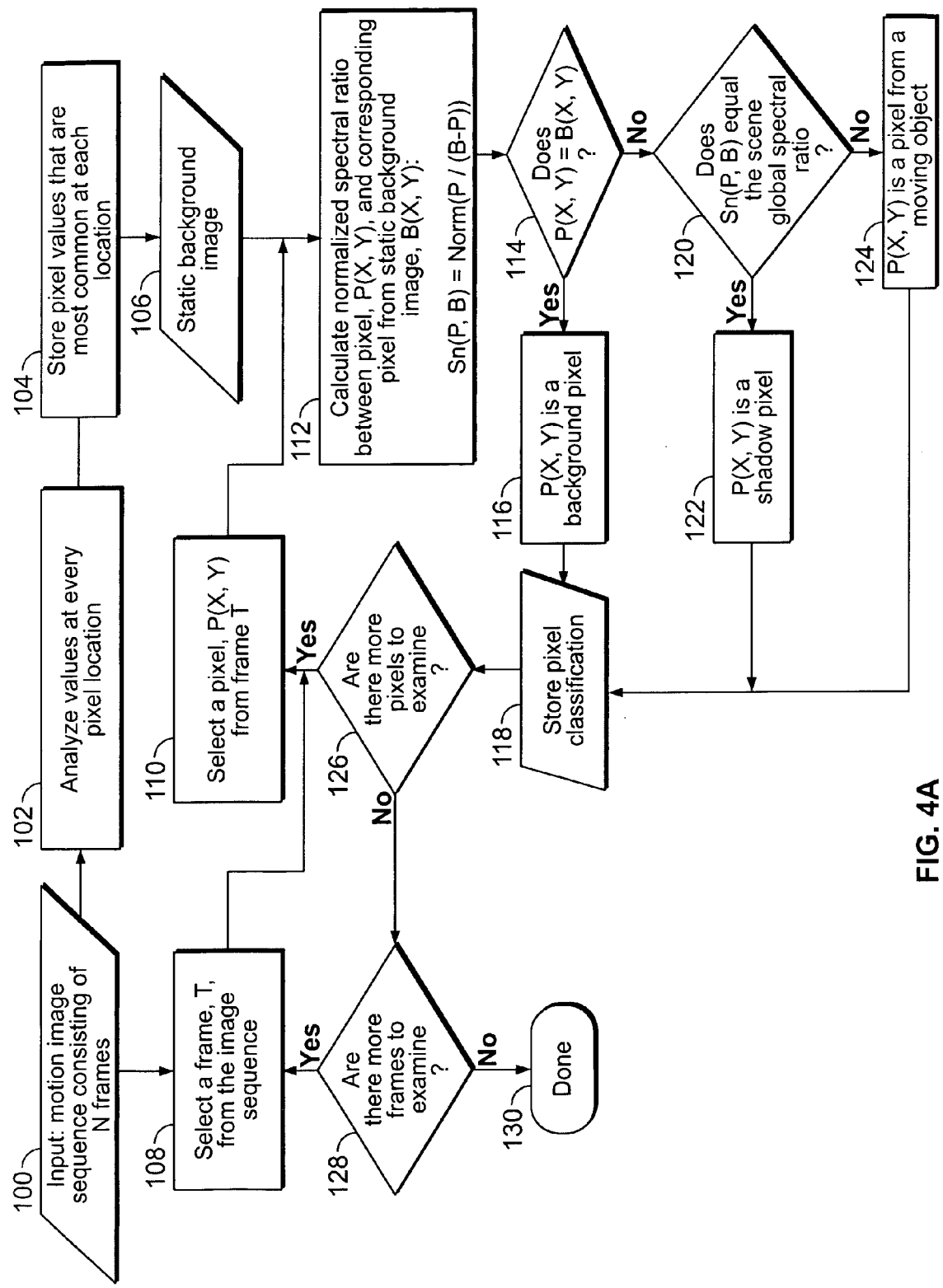
FIG. 4a is a flow chart for performing an operation to classify pixel types in a frame of a motion sequence with a static background image, according to a feature of the present invention.

FIG. 4a is a flow chart for performing an operation to classify pixel types in a frame of a motion sequence with a static background image, according to a feature of the present invention. As a first step (step 100), a sequence of image files 18, corresponding to N frames recorded in a time sequence by the video camera 14, is input to the CPU 12, for example, the images of FIGS. 3a-c. The recording of the N frames by the camera 14 can be in real time, relative to the execution of the routine of FIG. 4a by the CPU 12. In step 102, the CPU 12 analyzes each pixel of each frame represented by the sequence of image files 18. Step 102 is performed to determine each value for each pixel of the sequence of N frames, to establish the static background of the scene.

To that end, in step 104, the CPU 12 selects a pixel value for each scene location, in each instance a value corresponding to the most common value for the respective pixel from the N pixel values throughout the time sequence of N frames. As any value different from the static background value will be due to the temporary presence of a moving object, the common value occurring most frequently in the N frames will correspond to the static background value.

Performance of step 104 in respect of all of the pixel values for the N frames generates an image file 18 that depicts the static background, as for example, the image of FIG. 3d (step 106). Other known techniques for building a static background can be implemented, in lieu of the most frequent occurrence approach described above. Moreover, in a situation wherein the static background is fixed, and the video camera 14 is mounted in a predetermined fixed location, the video camera 14 can be operated to record the static background before any objects are permitted to pass through the scene. In that instance, step 106 will be the input to the CPU 12.

In step 108, an image file 18, corresponding to a single frame T of the N frames is input to the CPU 12, for analysis relative to the image file 18 depicting the static background. For example, the image depicted in FIG. 3a is analyzed relative to the static background of FIG. 3d. Each pixel of the subject frame is designated by its location within the corresponding image file 18: P(X, Y) and each pixel of the static background is likewise designated by a location: B(X, Y).

In step 110, the CPU 12 selects one pixel location P(X,Y) from the subject frame T for analysis to classify the selected pixel P(X, Y) as a background pixel, a pixel from a moving object, such as the ball of the example of FIGS. 3a-c, or a shadow pixel. In step 112, the CPU 12 calculates a normalized spectral ratio between the pixel P(X, Y) of the subject frame and the corresponding pixel in the static background image for the same X, Y location (B(X, Y)): Sn(P, B)=Norm (P/(B−P)). The CPU 12 then proceeds to decision block 114. In the decision block 114, the CPU 12 determines whether the pixel, P(X,Y) equals the corresponding pixel B(X,Y) of the static background. If yes, the particular pixel P(X,Y) is classified as a pixel depicting the static background of the scene (step 116). In step 118, the CPU 12 stores the pixel classification.

If no, the CPU 12 proceeds to decision block 120 for the respective pixel P(X, Y). In decision block 120, the CPU 12 compares the normalized spectral ratio for the pixel P(X,Y), Sn(P, B), as calculated in step 112, to the global or characteristic spectral ratio for the static background scene. The characteristic spectral ratio comprises the spectral information used to classify the respective pixel P(X, Y). The co-pending application Ser. No. 11/341,742 teaches methods for automatically determining a characteristic spectral ratio for a scene. For example, the CPU 12 is operated to identify spatio-spectral features of an image, that is, features that comprise conditions that are indicative of illumination flux. An example of a spatio-spectral feature is an X-junction. An X-junction is an area of an image where a material edge and an illumination boundary cross one another. An X-junction is an optimal location for an accurate determination of an illuminant ratio or characteristic spectral ratio for a scene.

To improve the accuracy and correctness of the characteristic ratio for an image, the spectral ratio information for illumination boundaries is determined on a local level, that is, an illuminant ratio is determined for each of several preselected local areas of a scene depicted in an image. An analysis of a boundary is then executed utilizing the spectral ratio for the specific location of the boundary within the image. The determination of locally relevant spectral ratios accommodates complexities that may be encountered in a real world image, for example, the interplay of several different sources of light in a room, inter-reflections, and so on.

A token analysis of an image is used to identify spatio-spectral features. A token is a connected region of an image wherein the pixels of the region are related to one another in a manner relevant to identification of spatio-spectral features. The pixels of a token can be related in terms of either homogeneous factors, such as, for example, close correlation of color among the pixels (a uniform token), or nonhomogeneous factors, such as, for example, differing color values related geometrically in a color space such as RGB space (for example, a linear token). The use of tokens rather than individual pixels reduces complexity and noise in image processing and provides a more efficient, less intense computational operation for the computer system 10.

A uniform token analysis is used to identify X-junctions in an image. A uniform token is a homogeneous token that comprises a connected region of an image with approximately constant pixel values (for example, within a range determined by the expected noise margin of the recording equipment or normal variations in materials) throughout the region. A first order uniform token comprises a single robust color measurement among contiguous pixels of the image. The analysis can include an examination of token neighbor relationships indicative of spatio-spectral features of an image.

Figure 4B:
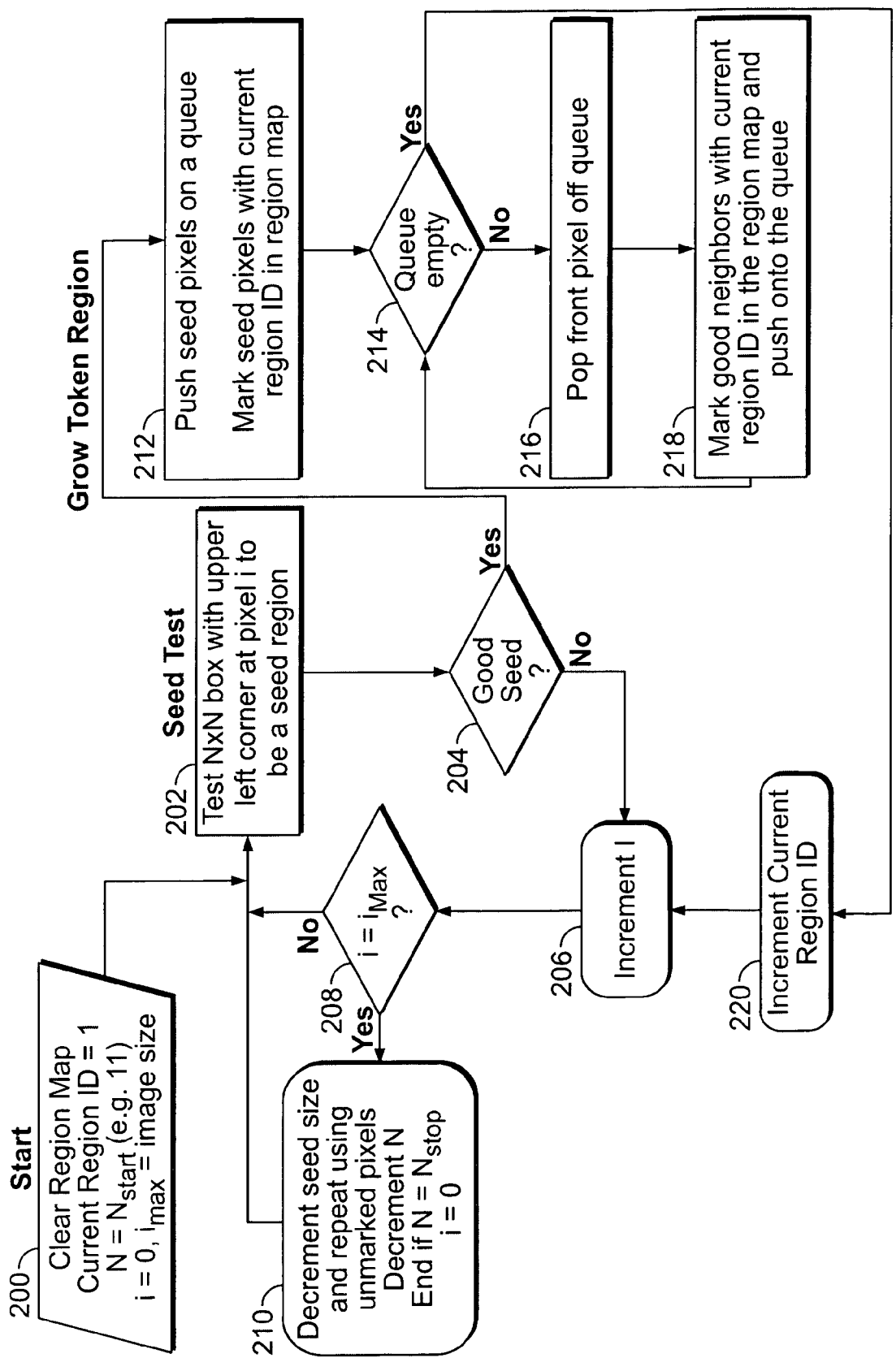
FIG. 4b is a flow chart for identifying token regions in the image file of FIG. 2, according to a feature of the present invention.

FIG. 4b shows a flow chart for identifying token regions in the subject frame of the N frames, (depicted as an image file 18 in FIG. 2), according to a feature of the present invention. At the start of the identification routine, the CPU 12 sets up a region map in memory. In step 200, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=$N_{start}$. $N_{start}$ can be any integer >0, for example it can be set at set at 11 or 15 pixels.

At step 202, a seed test is begun. The CPU 12 selects a first pixel, i=(1, 1) for example, the pixel at the upper left corner of a first N×N sample. The pixel is then tested in decision block 204 to determine if the selected pixel is part of a good seed. The test can comprise a comparison of the color value of the selected pixel to the color values of a preselected number of its neighboring pixels as the seed, for example, the N×N array. If the comparison does not result in approximately equal values for the pixels in the seed, the CPU 12 increments the value of i (step 206), for example, i=(1, 2), for a next N×N seed sample, and then tests to determine if i=$i_{max}$ (decision block 208).

If the pixel value is at $i_{max}$, a value selected as a threshold for deciding to reduce the seed size for improved results, the seed size, N, is reduced (step 210), for example, from N=15 to N=12. In an exemplary embodiment of the present invention, $i_{max}$ can be set at i=(n, m). In this manner, the routine of FIG. 3a parses the entire image at a first value of N before repeating the routine for a reduced value of N.

After reduction of the seed size, the routine returns to step 202, and continues to test for token seeds. An $N_{stop}$ value (for example, N=2) is also checked in step 210 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 202, and continues to test for token seeds.

When a good seed (an N×N array with approximately equal pixel values) is found (block 204), the token is grown from the seed. In step 212, the CPU 12 pushes the pixels from the seed onto a queue. All of the pixels in the queue are marked with the current region ID in the region map. The CPU 12 then inquires as to whether the queue is empty (decision block 214). If the queue is not empty, the routine proceeds to step 216.

In step 216, the CPU 12 pops the front pixel off the queue and proceeds to step 218. In step 218, the CPU 12 marks "good" neighbors around the subject pixel, that is neighbors approximately equal in color value to the subject pixel, with the current region ID. All of the marked good neighbors are placed in the region map and also pushed onto the queue. The CPU then returns to the decision block 214. The routine of steps 214, 216, 218 is repeated until the queue is empty. At that time, all of the pixels forming a token in the current region will have been identified and marked in the region map.

When the queue is empty, the CPU proceeds to step 220. At step 220, the CPU 12 increments the region ID for use with identification of a next token. The CPU 12 then returns to step 206 to repeat the routine in respect of the new current token region. Upon arrival at N=$N_{stop}$, step 110 of the flow chart of FIG. 4b, or completion of a region map that coincides with the image, the routine will have completed the token building task.

Figure 4C:
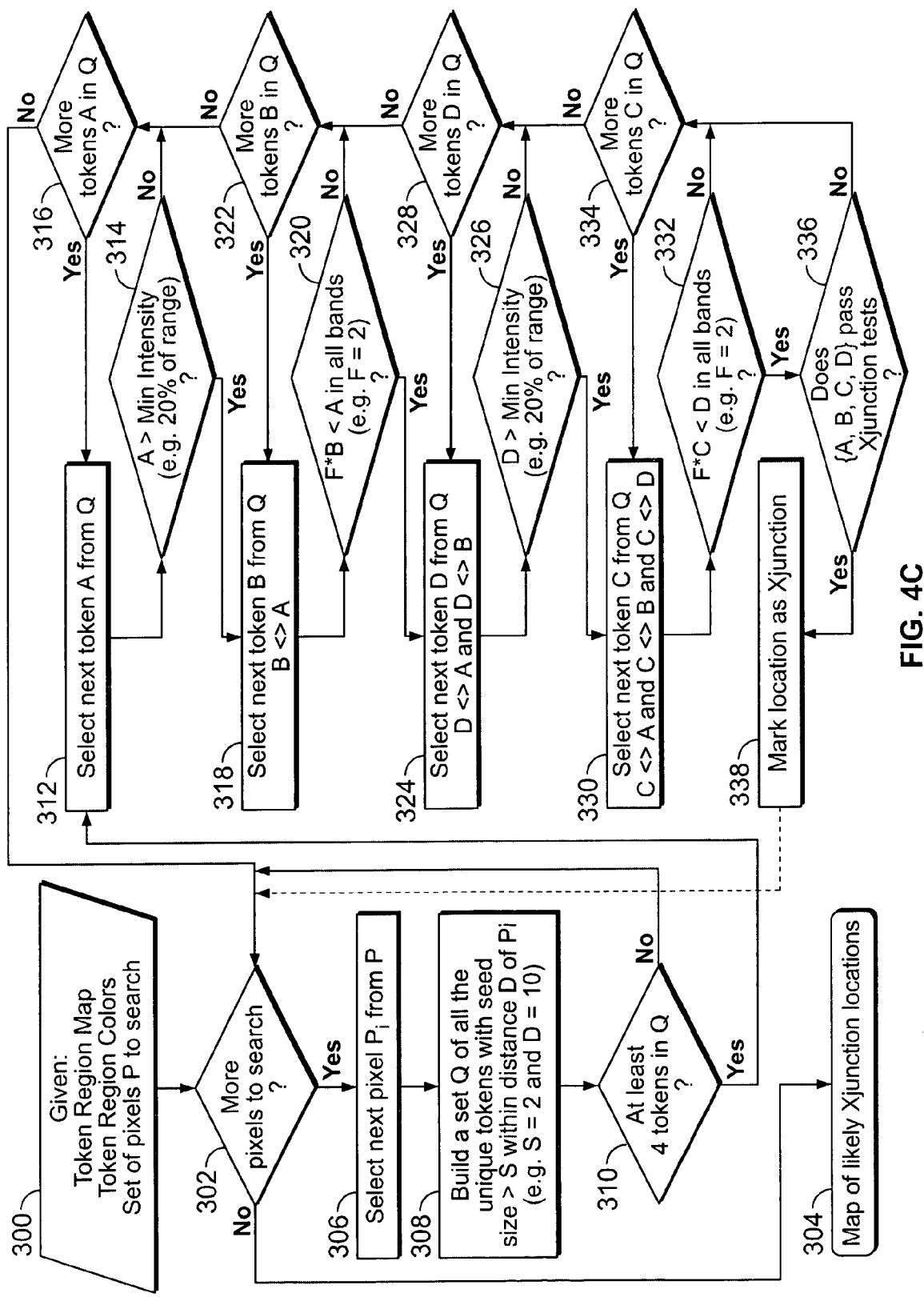
FIG. 4c is a flow chart for identifying X-junctions in an image, according to a feature of the present invention.

Upon completion of the token region map for the frame, the CPU 12 proceeds to the routine of FIG. 4c, to identify X-junctions in the image of the subject frame using the token region map. In step 300, the CPU 12 is input the token region map completed through execution of the routine of FIG. 4b, the color of each token region and a set of pixels to provide a basis for searching for X-junctions. The pixel set can be a subset of the pixels of the image, for example, selecting every Nth pixel of every Nth row, or jitter sampling, for example selecting a pixel randomly of each N×N box throughout the image. In our examples, N=4.

In a decision block (step 302), the CPU 12 determines whether there are still pixels in the pixel set for search of an X-junction. If no, the CPU 12 exits the routine with a map of likely X-junctions in the frame (step 304). If yes, the CPU 12 proceeds to step 306, to select a next pixel Pi, from the pixel set.

In step 308, the CPU 12 builds a set Q of all unique tokens with a seed size >S within a distance D of the pixel Pi. In our example, S=2 and D=10. In a decision block (step 310), the CPU 12 determines if the set Q has at least four tokens. If no, the CPU 12 returns to the decision block of step 302. If yes, the CPU 12 proceeds to step 312.

In step 312, the CPU 12 selects a token from the set Q to designate as a token A. In a decision block (step 314), the CPU 12 tests the token A to determine whether A>Minimum intensity, for example an intensity equal to 20% of the maximum intensity within the subject frame. If no, the CPU 12 proceeds to a decision block (step 316) to determine whether there are more tokens in the set Q for testing as an A token. If yes, the CPU 12 returns to step 312 to repeat the test. If no, the CPU 12 returns to step 302.

If the CPU 12 determines a yes condition in the decision block of step 314, the CPU 12 proceeds to step 318.

In step 318, the CPU 12 selects a token from the set Q to designate as a token B (with B not equal to A). In a decision block (step 320), the CPU 12 tests the token B to determine whether F*B<A in all color bands. In our example, F=2. If no, the CPU 12 proceeds to a decision block (step 322) to determine whether there are more tokens in the set Q for testing as a B token. If yes, the CPU 12 selects another token and returns to step 318 to repeat the test. If no, the CPU 12 returns to step 316.

If the CPU 12 determines a yes condition in the decision block of step 320, the CPU 12 proceeds to step 324.

In step 324 the CPU 12 selects a token from the set Q to designate as a token D (D not equal to either A or B). In a decision block (step 326), the CPU 12 tests the token D to determine whether D>Minimum intensity, for example an intensity equal to 20% of the maximum intensity within the subject frame. If no, the CPU 12 proceeds to a decision block (step 328) to determine whether there are more tokens in the set Q for testing as an D token. If yes, the CPU 12 selects another token and returns to step 324 to repeat the test. If no, the CPU 12 returns to step 322.

If the CPU 12 determines a yes condition in the decision block of step 326, the CPU 12 proceeds to step 330.

In step 330, the CPU 12 selects a token from the set Q to designate as a token C (C not equal to either A or B or D). In a decision block (step 332), the CPU 12 tests the token C to determine whether F*C<D in all color bands. In our example, F=2. If no, the CPU 12 proceeds to a decision block (step 334) to determine whether there are more tokens in the set Q for testing as a C token. If yes, the CPU 12 selects another token and returns to step 330 to repeat the test. If no, the CPU 12 returns to step 328.

If the CPU 12 determines a yes condition in the decision block of step 332, the CPU 12 proceeds to step 336.

Figure 4D:
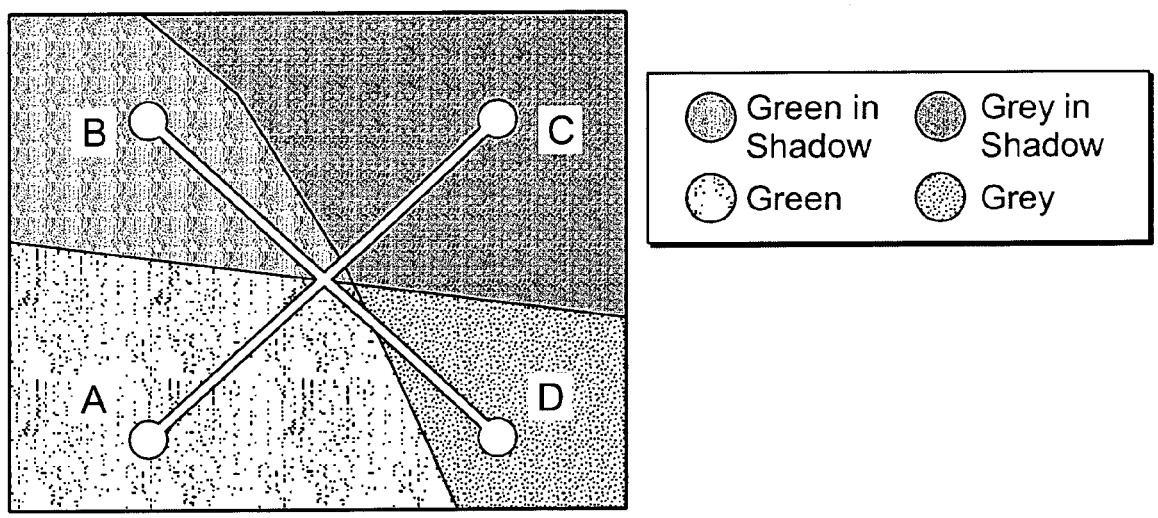
FIG. 4d shows an image having an x-junction.
Figure 4E:
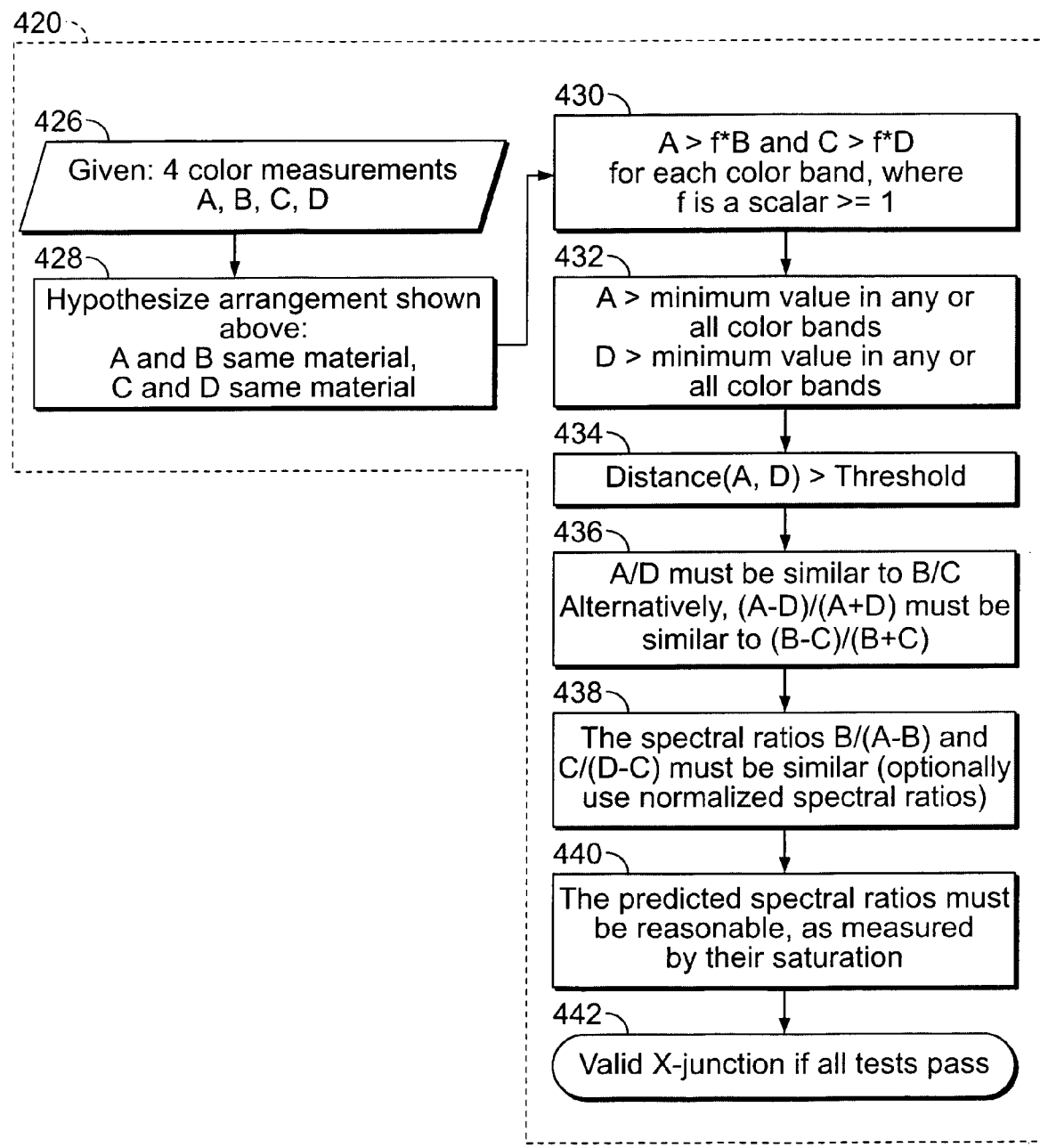
FIG. 4e is a flow chart for an X-junction testing sub-routine of the flow chart of FIG. 4c.

FIG. 4e shows a flow chart for the X-junction testing subroutine, step 336 of the flow chart of FIG. 4c. In step 426 the token neighbor set {A, B, C, D} is set as the starting point of the routine. As noted, the hypothesis is that A and B are the same material 1, and that D and C are the same material 2, and that B and C are in shadow (step 428, see FIG. 4d).

In a first test, step 430, the CPU 12 determines whether the pixels of token A>the pixels of token B and the pixels of token D>the pixels of token C, in each color band. The colors B and C are multiplied by a factor, f, which is a scalar value greater than 1. In step 432, it is determined whether the bright measurements for A and D tokens are brighter than a minimum threshold.

The next test (step 434) comprises a determination of whether each of the bright tokens A and D, are significantly different in a color space, for example, in an RGB space. In this regard, a determination is made as to whether the color space distance (A, D)>threshold.

In step 436 the CPU 12 determines whether the reflectance ratio between A and D is approximately equal to the reflectance ratio for B and C. The bounded version of the ratios can be used, $R_1=(A-D)/(A+D)$, and $R_2=(B-C)/(B+C)$, with $R_1=R_2$. In step 438, the spectral ratios $S_1=B/(A-B)$ and $S_2=C/(D-C)$ are compared to determine if they are similar to one another (within a predetermined difference).

In step 440, the CPU 12 determines if the spectral ratios fit an a priori model of a reasonable illuminant. Variations on the constraints can include, for example, requiring the dark measurements for the B and C tokens to be less than a percentage of the corresponding bright measurement. Moreover, the CPU 12 can test the spectral ratios determined in step 338 for saturation levels. Saturation is defined as saturation=1−(minimum color band/maximum color band). An upper boundary can be established for the spectral ratio, in terms of saturation, for example, any spectral ratio with a saturation >0.9 is considered to be unreasonable. If all of the above constraints are met, the X-junction criteria are considered to be satisfied (step 442).

In the event a token set {A, B, C, D} fails the X-junction tests of step 336, the CPU 12, returns to step 334. If the token set {A, B, C, D} passes the X-junction tests of step 336, the CPU 12 proceeds to step 338 to mark the token set {A, B, C, D} as a valid X-junction. The CPU 12 then returns to step 302.

Figure 4F:
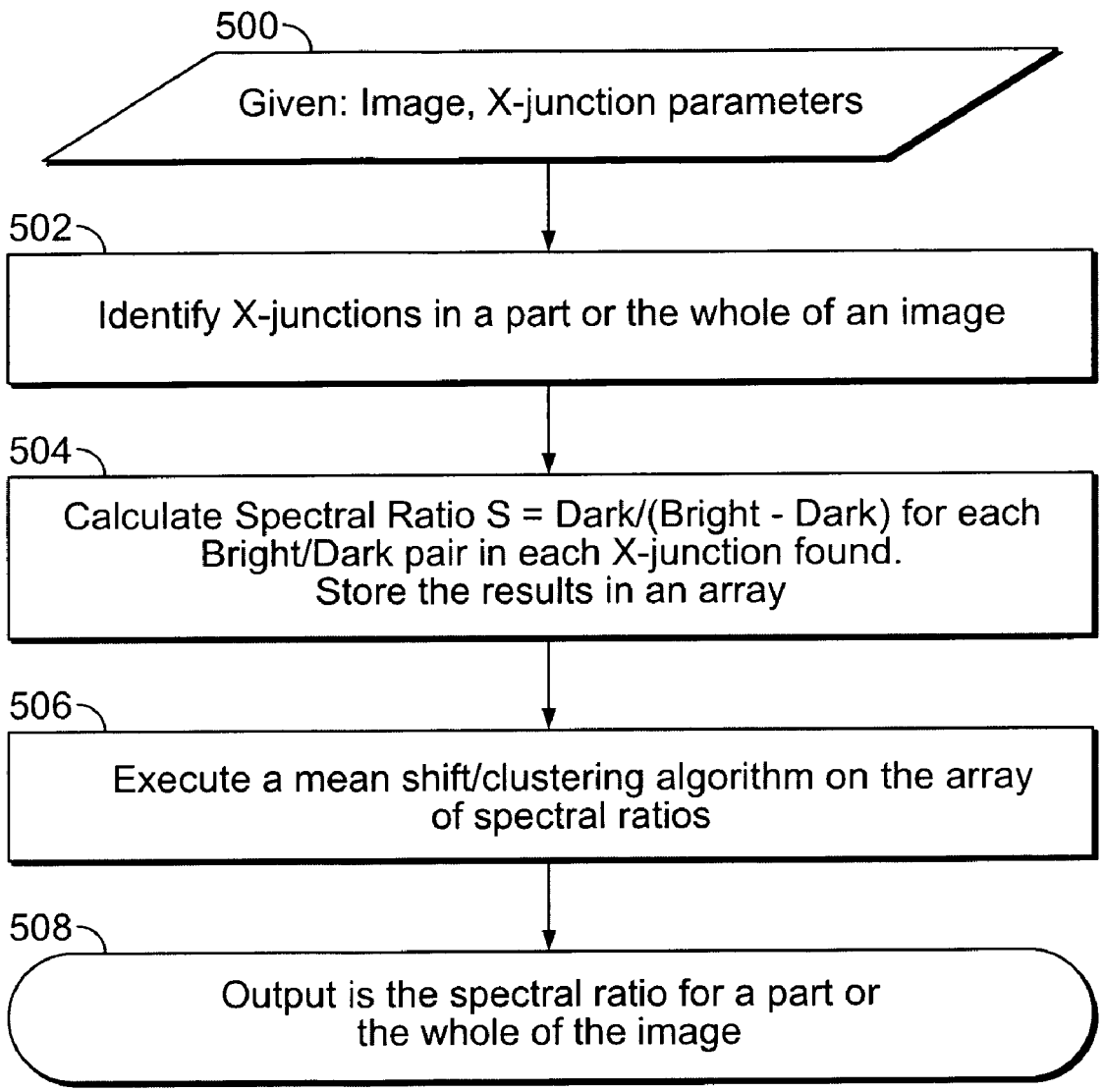
FIG. 4f is a flow chart for identifying a local spectral ratio using an X-junction of FIG. 4d, according to a feature of the present invention.

Referring now to FIG. 4f, there is shown a flow chart for identifying a local spectral ratio using an X-junction, according to a feature of the present invention. The CPU 12 is given the image file 18 of the subject frame of the N frames, and X-junction parameters in step 500. The CPU 12 then proceeds to step 502, which comprises the performance of the processes of FIGS. 4b-e, throughout the given image to identify all X-junctions within the image.

Upon completion of step 502, the CPU 12 proceeds to step 504 to calculate a spectral ratio for each bright/dark pixel pair in each X-junction, and store the results in a memory array. In step 506, the CPU 12 executes a mean shift algorithm on the array of spectral ratios. The mean shift algorithm can comprise, for example, an algorithm described in "Mean shift analysis and applications," Comaniciu, D.; Meer, P.; Computer Vision, 1999, The Proceedings of the Seventh IEEE International Conference on; Volume 2, 20-27 Sep., 1999; Pages 1197-1203. The output of execution of the mean shift algorithm (step 508) is a spectral ratio for all or a specific local region of the image. The execution of step 506 can include a survey of values for the spectral ratios throughout the image.

If the spectral ratios calculated over the image by, for example, one of the methods described above, vary by an amount >a threshold variance, a local approach will be implemented for the spectral ratio information used in determining illumination boundaries. That is, the value at a specific X-junction, or a mean or median of a set of nearby X-junctions will be used as the spectral ratio when the CPU 12 determines illumination boundaries in the region of the image near the specific X-junction. If all of the spectral ratios for the entire image vary by less than the threshold variance, a global approach can be used with the same mean shift spectral ratio used in all illumination boundary determinations.

Upon determination by the CPU 12 of a characteristic spectral ratio for the static background scene (from step 106 of FIG. 4a), the CPU 12 returns to step 120 of FIG. 4a to run the comparison between the normalized spectral ratio for the pixel P(X,Y) from the subject frame T, Sn(P, B), as calculated in step 112, and the characteristic spectral ratio for the static background scene. If Sn(P, B) is similar enough to the characteristic spectral ratio for the static background scene, the pixel P(X,Y) is classified as a shadow pixel (step 122), and the CPU 12 stores the classification (step 118). The similarity between Sn(P, B) and the characteristic spectral ratio can be a function of noise present in the sensing equipment. If the ratios are not equal, the pixel P(X, Y) is classified as a pixel from a moving object (step 124), and the CPU 12 stores the classification for the pixel P(X, Y) in step 118.

Once a pixel P(X, Y) is classified, and the classification is stored (step 118), the CPU 12 proceeds to a decision block (step 126). In the decision block, the CPU 12 determines whether there are any more pixels in the subject frame T for classification. If yes, the CPU 12 returns to step 110, selects another pixel P(X, Y), and continues to the steps 112-124. If no, the CPU 12 proceeds to the decision block of step 128. In the decision block of step 128, the CPU 12 determines whether there are any more frames T in the sequence of N frames, for examination of pixel values. If yes, the CPU 12 returns to step 108, selects another frame T, and continues to steps 110-124. If no, the routine is complete (step 130).

Several enhancements can be implemented to improve the accuracy of the pixel classification obtained through execution of the routine of FIG. 4a. For example, pixels having a value that is either clipped by the maximum level of the image sensor of the video camera 14, or at the low level of the dark range and therefore subject to sensor noise, are often inaccurate, and can be ignored. Any pixel having an overall intensity value that is higher than the corresponding background pixel can be classified as an object. This is because a background pixel in shadow is always less intense than a fully lit background pixel, and, thus, the higher intensity indicates that it is not a background pixel.

Similarly, any pixel having an overall intensity value that is darker than the corresponding background pixel, but having at least one color channel that is brighter than that color channel for the background pixel can be classified as a pixel of an object. This is because when a change is due to shadow, all of the channels must change in the same direction.

There are instances when the pixel value of an object is nearly identical to the corresponding pixel of the background image in some degree of shadow. Under such circumstances a known texture matching technique can be used to compare the subject pixel to surrounding pixels. If there is not a match, the subject pixel may be related to a moving object.

FIGS. 5a-e depict a sample image sequence in time illustrating an object in a background field of view having a variable illumination, as may occur, for example, when utilizing a video camera mounted outdoors. In the example of FIGS. 5*a-e*, the shadow of a tree leaf, under bi-illuminant conditions, is projected onto the scene background. The shadow moves in time, within the background field of view, and is the result of a leaf a considerable distance from the scene, causing a significant penumbra and highly variable illumination flux on many pixels of the recorded sequence of images.

Figure 5A:
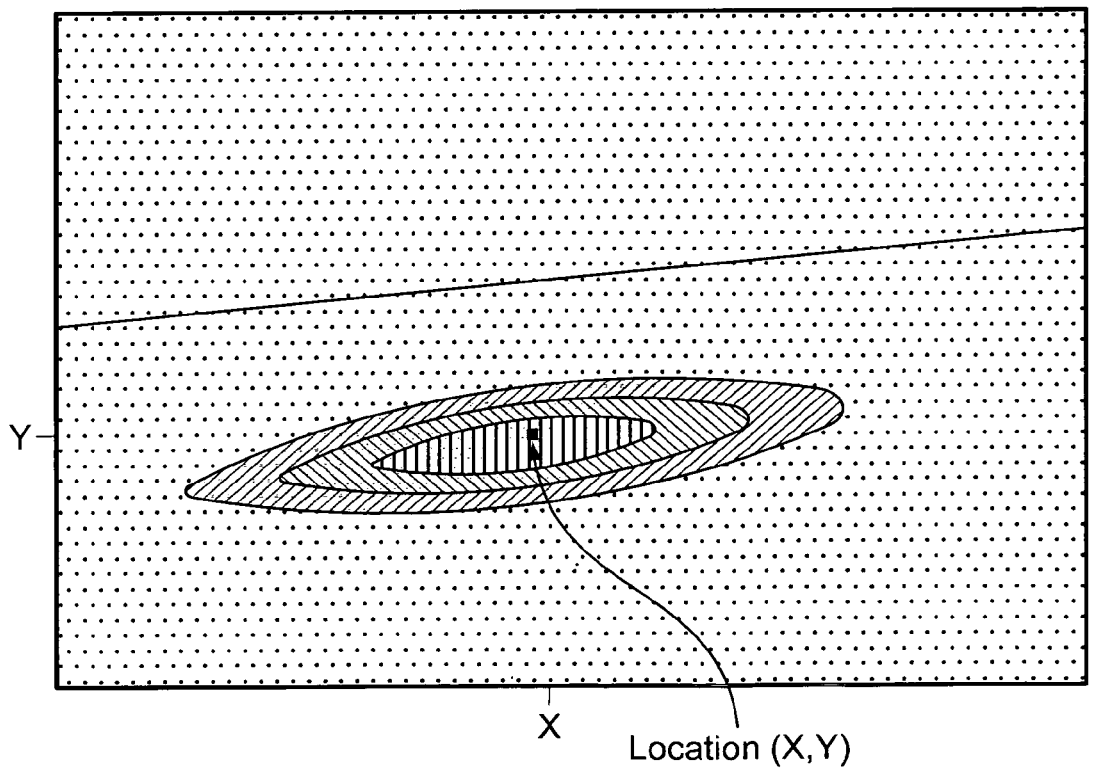
FIGS. 5a-e depict a sample image sequence illustrating an object moving in a background field of view having a variable illumination.
Figure 5B:
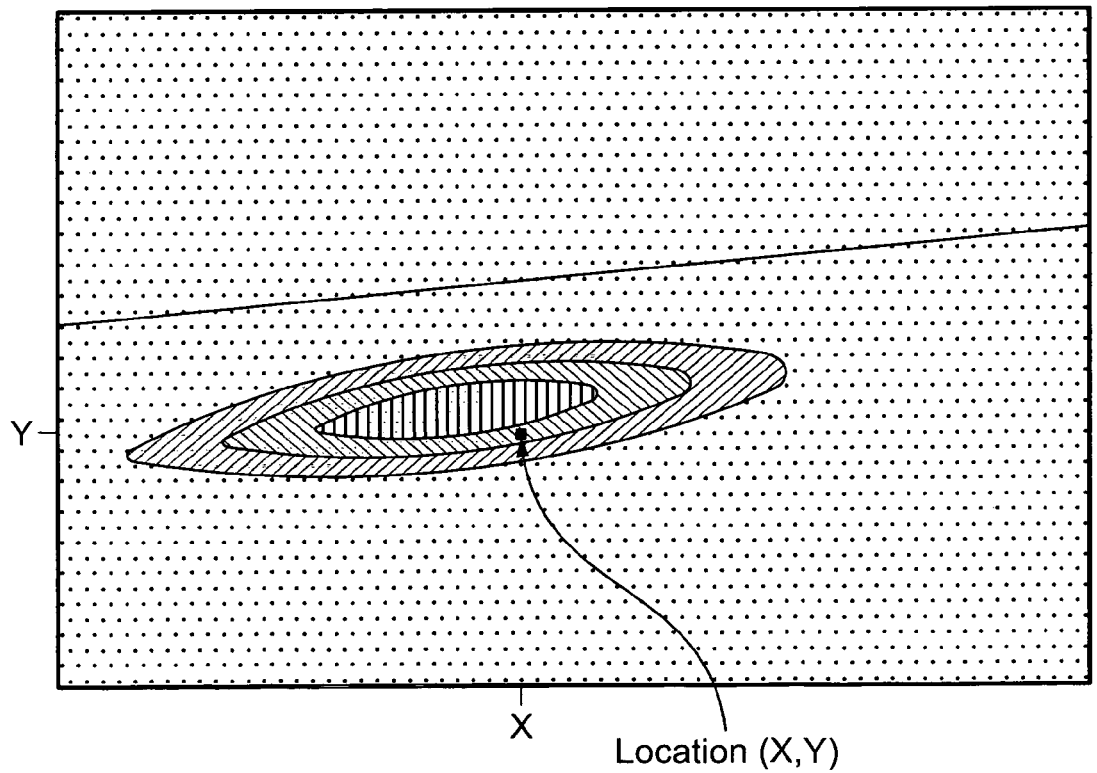

In a first frame of the sequence, depicted in FIG. 5*a*, a location (X, Y) is within the full shadow of the leaf, and thus, illuminated solely by the ambient illuminant of the bi-illuminant flux. In a second frame, recorded at a time subsequent to the time of the first frame (FIG. 5*b*), the location (X, Y) is now in the shadow penumbra, illuminated by the ambient illuminant and approximately one third of the direct or incident illuminant.

Figure 5C:
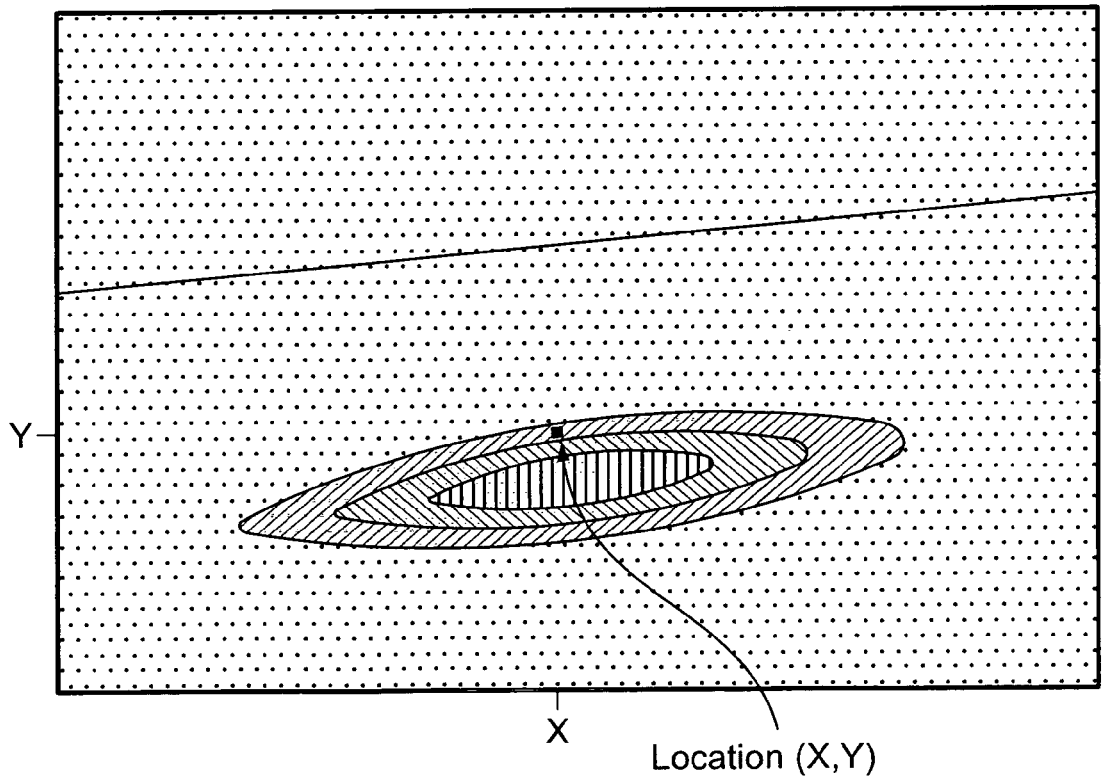
Figure 5D:
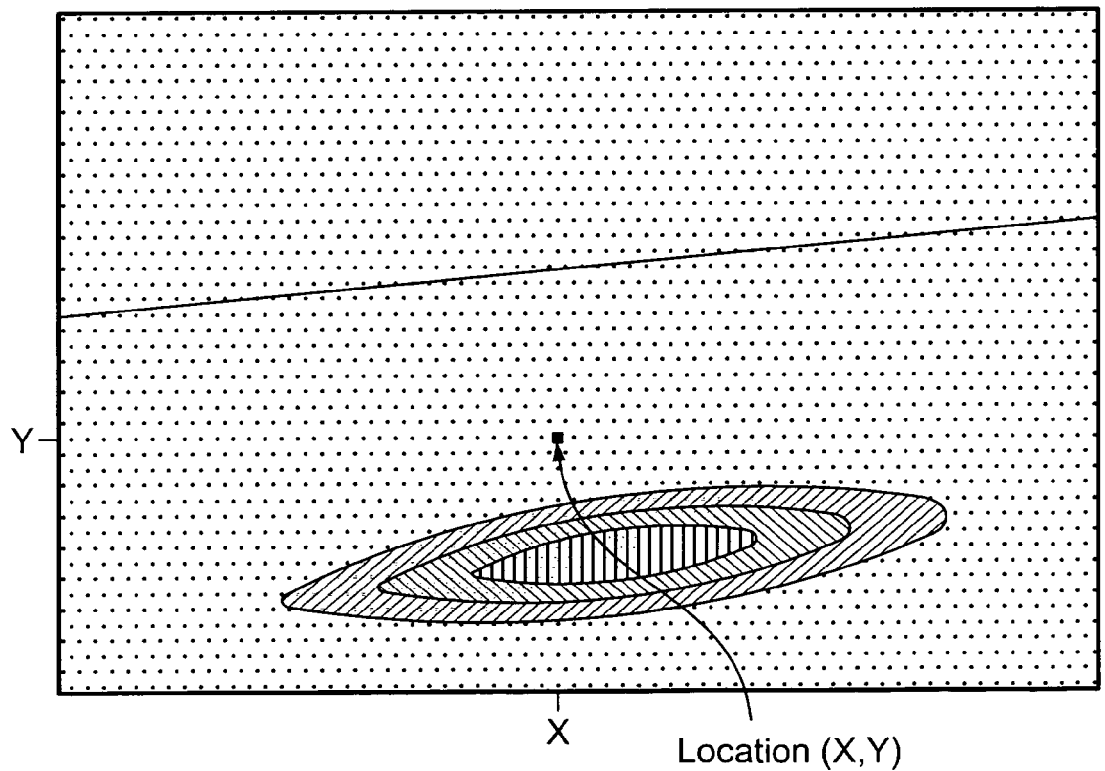
Figure 5E:
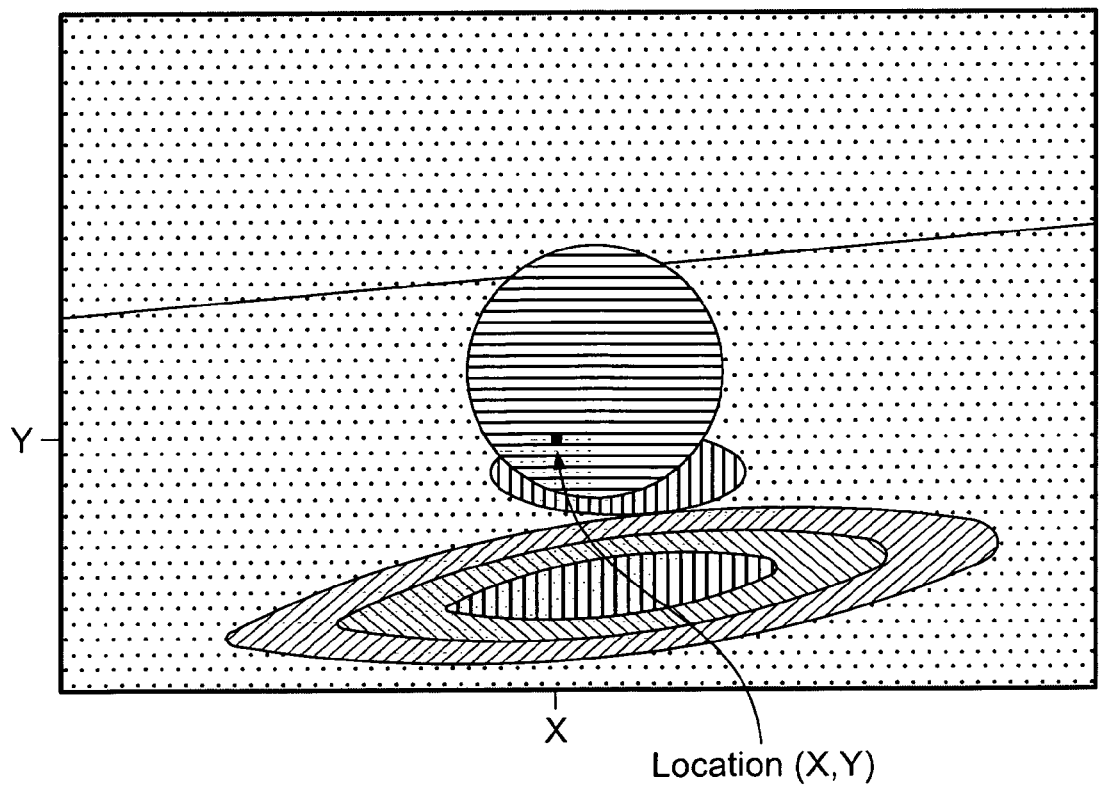

In FIG. 5*c*, a third frame of the sample sequence, the location (X, Y) is in a portion of the penumbra illuminated by the ambient illuminant and approximately two thirds of the incident illuminant. In a fourth frame (FIG. 5*d*), the shadow has moved beyond the location (X, Y), leaving the location within the scene background, fully lit by the incident illuminant and the ambient illuminant. Finally, in a fifth frame, FIG. 5*e*, the location(X,Y) is covered by an object, in our example, a ball, that has moved into the field of view. The ball is lit by the incident illuminant and the ambient illuminant and projects a shadow.

As discussed above, a linear token is a set of pixels of differing color values related geometrically in a color space such as RGB space, for example, an axially extending linear or cylindrical geometric shape, from a dark end (in shadow) to a bright end (lit end), along a positive slope. A linear or cylindrical configuration for the token is predicted by a bi-illuminant dichromatic reflection model (BIDR model), according to a feature of the present invention, when the color change is due to an illumination change forming a shadow (i.e. a decrease in the intensity of the incident illuminant as the interplay between the incident or direct illuminant and the ambient illuminant in the illumination field) over a single material of a scene depicted in the image (a BIDR cylinder).

For purposes of describing, identifying and using linear tokens, the BIDR model can be stated as: $I(x, y, z, \theta, \phi, \lambda) = c_b(\lambda) l_d(\lambda) \gamma_b + M_a(\lambda) c_b(\lambda)$, where: $I_{(x, y, z, \theta, \phi, \lambda)}$ is the radiance of a surface point at (x, y, z) in the direction $\theta$, $\phi$ for the wavelength $\lambda$, $c_b(\lambda)$ is the geometry independent body reflectance of a surface for the wavelength $\lambda$, $l_d(\lambda)$ is the incident illuminant for the wavelength $\lambda$. $\gamma_b$ is the product of a shadow factor $s_{x, y, z}$ and a geometric factor $m_b(\theta_i)$ and $M_a(\lambda)$ is the integral of the ambient illuminant and geometric body reflectance over a hemisphere, excluding the incident illuminant. For a more detailed discussion of the BIDR model reference is made to co-pending application Ser. No. 11/341,751, filed on Jan. 27, 2006, entitled: "Bi-illuminant Dichromatic Reflection Model For Image Manipulation," now published as US 2007/0176940 on Aug. 2, 2007, which is hereby incorporated by reference.

Figure 6:
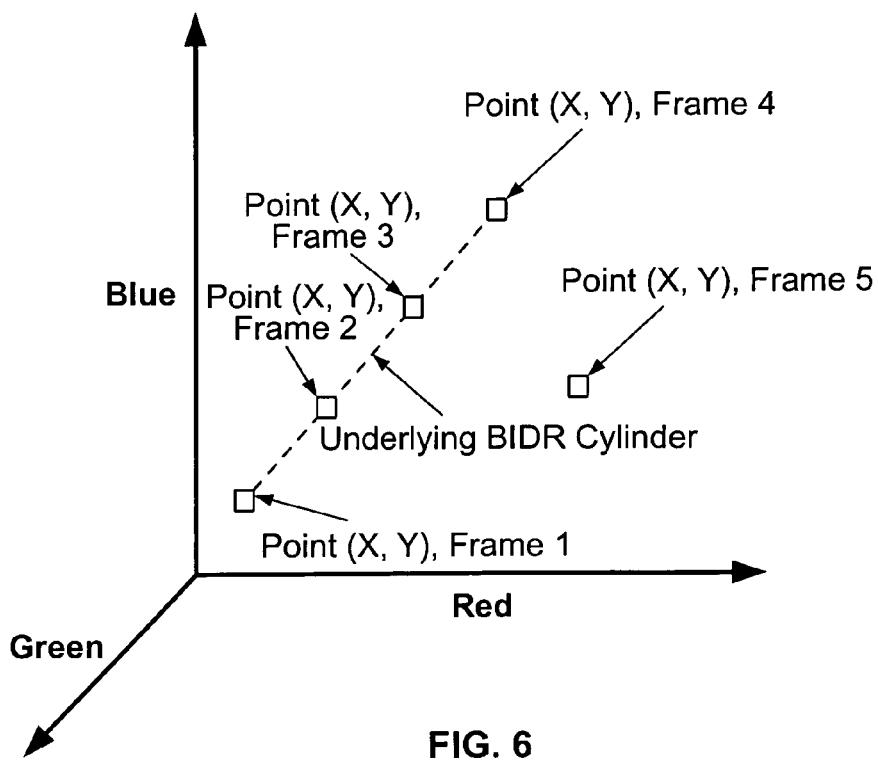
FIG. 6 is a graph showing a representation of a temporal linear token, according to a feature of the present invention.

FIG. 6 is a graph showing a representation of a temporal linear token, according to a feature of the present invention. A temporal linear token is a linear token wherein the set of pixels of differing color values related geometrically comprises a single pixel location, for example, location(X, Y) of FIGS. 5*a-e*, at different times, for example, the time sequence of FIGS. 5*a-e*. The graph of FIG. 6 is in an RGB space, and depicts the color values for the location(X, Y) at each of frames 1-5 of FIGS. 5*a-e*.

As can be seen in the graph of FIG. 6, Point(X, Y), Frame 1 corresponds to the location(X, Y) at the time of frame 1, when the location(X,Y) is in full shadow of the leaf, and thus, illuminated solely by the ambient illuminant of the bi-illuminant flux. At Point(X,Y), Frame 2, the location(X,Y) is in the shadow penumbra, and illuminated by the ambient illuminant and one third of the direct or incident illuminant. At Point(X, Y), Frame 3, the location(X, Y) is in the shadow penumbra, and illuminated by the ambient illuminant and approximately two thirds of the direct or incident illuminant. Point(X, Y), Frame 4 corresponds to the location(X, Y) after the shadow has moved beyond the location(X, Y), leaving the location within the scene background, fully lit by the incident illuminant and the ambient illuminant.

As can be seen in the graph of FIG. 6, the points corresponding to frames 1-4, comprise a temporal linear token defining a line that represents a BIDR cylinder (the spectral information) that can be utilized to classify pixels of an image sequence. Thus, any pixel that falls in or near the temporal linear token defined by, for example, the points of frames 1-4 (the BIDR cylinder), can be classified as a pixel depicting the background scene under varying illumination. Any pixel that falls outside the BIDR cylinder in the RGB space, would be classified as a pixel value of an object distinct from the background scene. Point(X, Y), Frame 5, corresponding to the location(X, Y) when it is covered by an object, in our example, a ball, that has moved into the field of view, falls outside the BIDR cylinder in the RGB space of FIG. 6. Thus, the pixel at point(X,Y), Frame 5, is recognized as belonging to a newly introduced object.

Figure 7:
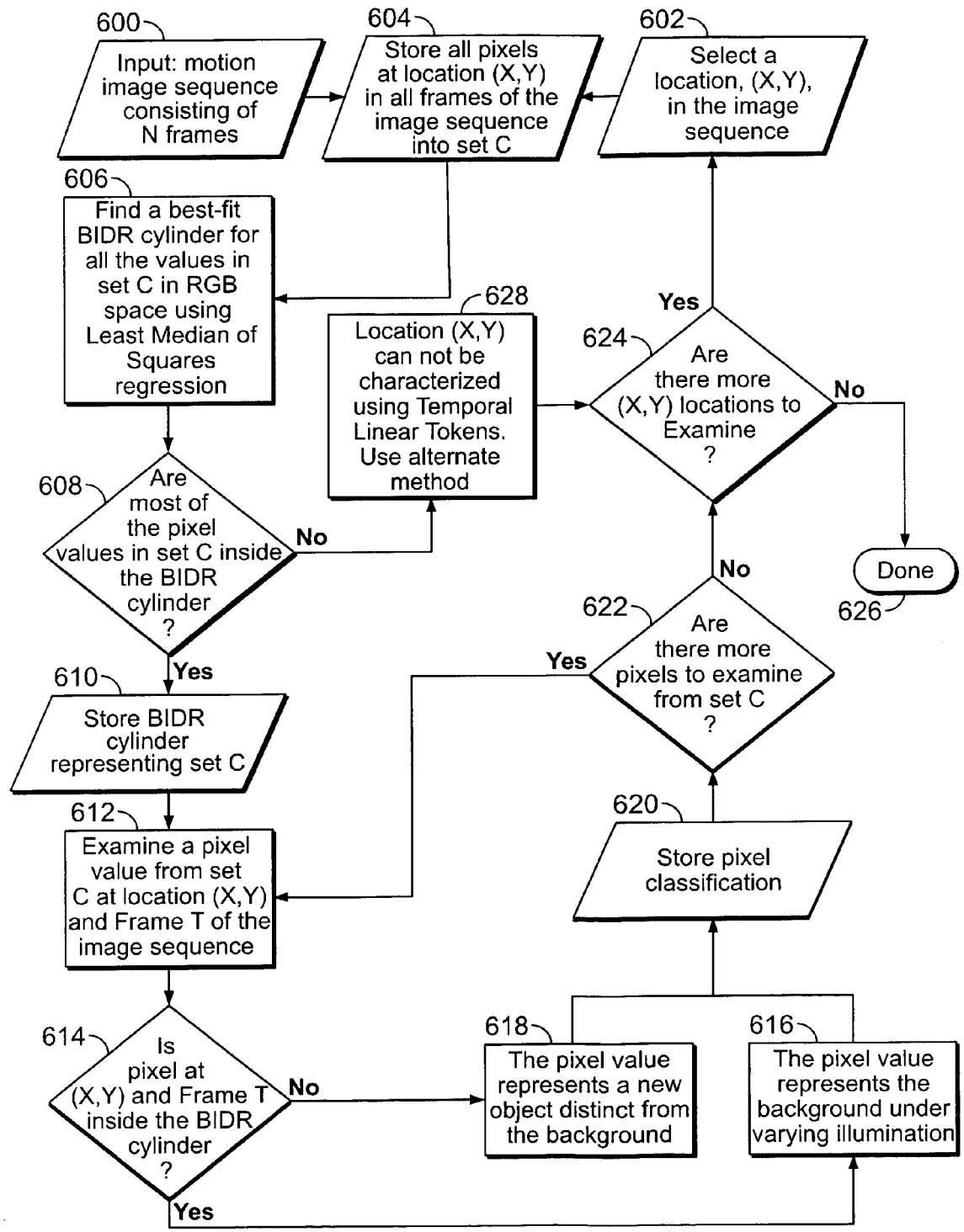
FIG. 7 is a flow chart for performing an operation to classify pixel types in a frame of a motion sequence with highly variable illumination, according to a feature of the present invention.

Referring now to FIG. 7, there is shown a flow chart for performing an operation to classify pixel types in a frame of a motion sequence with highly variable illumination, using a BIDR cylinder according to a feature of the present invention. In step 600, a sequence of image files 18, corresponding to N frames recorded in a time sequence by the video camera 14, is input to the CPU 12, for example, the images of FIGS. 5*a-e*. In step 602, a location(X, Y) in the scene depicted in the sequence N is selected and input to the CPU 12. In step 604, the CPU 12 stores all of the pixel values throughout the sequence of N frames, for the selected location(X, Y) as a set C.

According to a feature of the present invention, in step 606, the CPU 12 performs a mathematical operation, such as, for example, a linear regression technique or a least median of squares regression technique, to find a best fit BIDR cylinder in an RGB space corresponding to the pixel values of the set C. An example of such a mathematical technique is described in "Least Median of Squares Regression" by Peter J. Rousseuw, Journal of American Statistical Association, Vol. 79, No. 388 (December, 1984), pp. 871-880.

In step 608, the CPU 12 determines whether predetermined amount of the pixel values in the set C are within a predetermined relationship to the BIDR cylinder, the dimensions of the cylinder being related to an axis between a fully lit value for the pixel values of the set C, and a value for the pixels of set C in shadow, and a radius determined as a function of variations in pixel values due to noise and other naturally occurring phenomena. The predetermined amount of pixels can be set at an amount that indicates a BIDR cylinder confirmation, for example, 80% of the pixels of the set C. If the pixel values of the set C correspond to a location that is subject to variable illumination flux, as in our example, a location in the scene over which the shadow of a leaf variously passes, the values will define a BIDR cylinder, that can then be used to classify the pixel values at that location.

If yes, the CPU 12 continues to step 610 to store the BIDR cylinder representing the set C. In step 612, the CPU 12 examines a selected pixel value from the set C, corresponding to a single frame T of the sequence N of frames. In a decision block (step 614), the CPU 12 determines whether the selected pixel value for the frame T is within the stored BIDR cylinder. If yes, the pixel value is classified as representing the background under varying illumination (step 616), if no, the pixel value is classified as an object distinct from the background (step 618). In either instance, the CPU 12 proceeds to step 620 to store the classification for the selected pixel value.

In a decision block (step 622), the CPU 12 determines whether there are more pixel values in the set C, for examination and classification. If yes, the CPU 12 returns to step 612, if no, the CPU 12 continues to a decision block (step 624). In the decision block of step 624, the CPU 12 determines whether there are any more locations (X, Y) in the scene depicted in the sequence of images N. If no, the CPU 12 exits the routine of FIG. 7 (step 626). If yes, the CPU 12 returns to step 602.

Referring once again to step 608, if most of the pixel values in the set C do not define a BIDR cylinder, the location(X, Y) can not be characterized using a temporal linear token (step 628), and the CPU 12 returns to step 624. The CPU 12 can store all of the pixel locations that do not define a BIDR cylinder, and upon completion of the routine of FIG. 7, return to the routine of FIG. 4a, for execution in respect of the stored pixel locations. When performing the routine of FIG. 4a for the pixel locations that do not define a BIDR cylinder, step 108 is changed to input a set of pixels corresponding to the stored locations for the N images of the sequence, and step 126 exits the routine when there are no more pixels to examine.

Enhancements, such as those described above in respect of FIG. 4a, can be implemented to improve the accuracy of pixel classification. Moreover, temporal linear tokens defining BIDR cylinders can be utilized to determine spectral ratios for the image. Each temporal linear token includes a brightest pixel and a darkest pixel. Those pixels can be used to calculate a spectral ratio for the corresponding token. The temporal linear tokens with the greatest ratios of intensity provide a measurement of the characteristic spectral ratio for the scene.

Figure 8A:
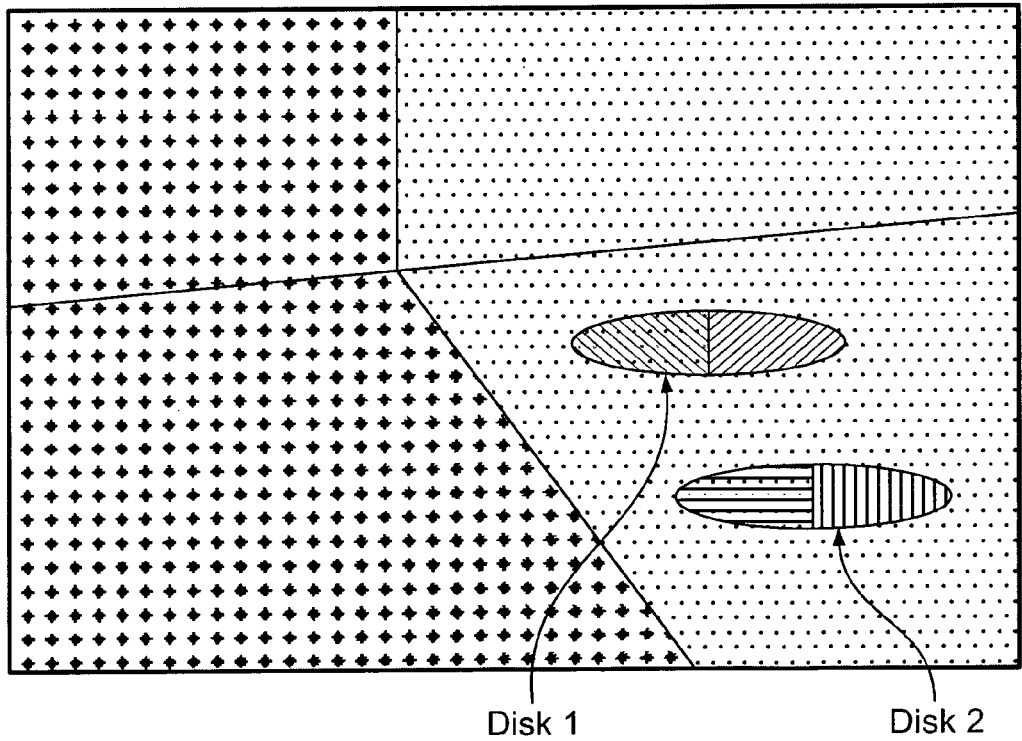
FIGS. 8a,b depict a sample image sequence showing two objects moving across a scene from full illumination to shadow under bi-illuminant conditions.
Figure 8B:
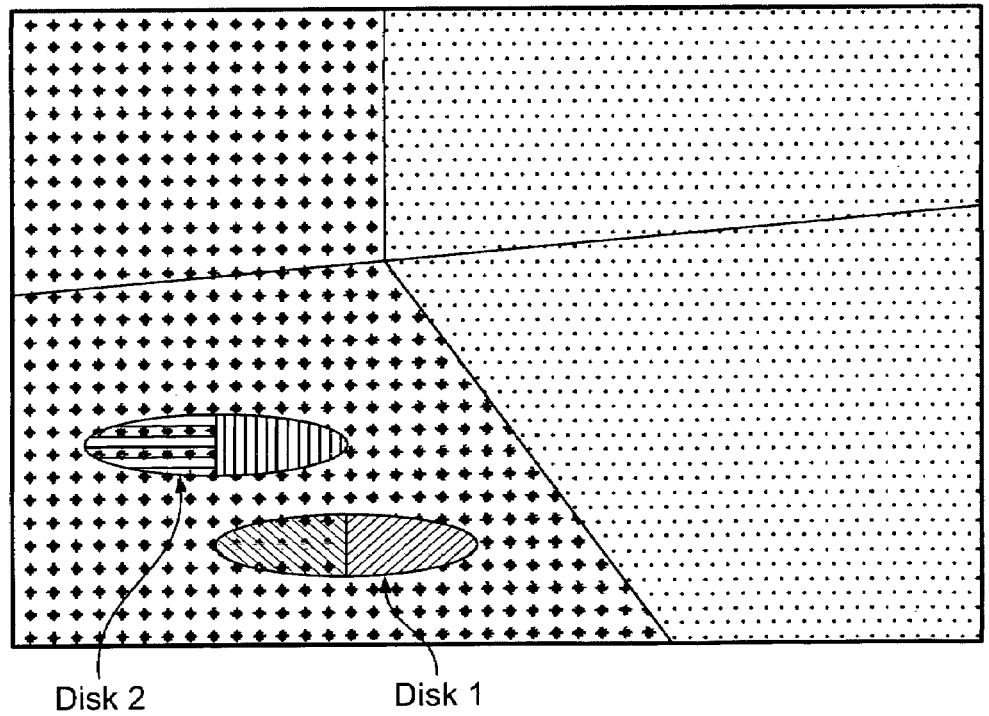

FIGS. 8a,b depict a sample image sequence in time showing two objects moving across a scene from full illumination to shadow under bi-illuminant conditions. In FIG. 8a, there is shown two objects, disk 1 and disk 2, each comprising two materials. The objects are shown while in a section of the background image that is illuminated by both an incident illuminant and an ambient illuminant. In FIG. 8b, the disks have moved into a section of the background image that is in full shadow, and thus illuminated solely by the ambient illuminant.

Figure 9A:
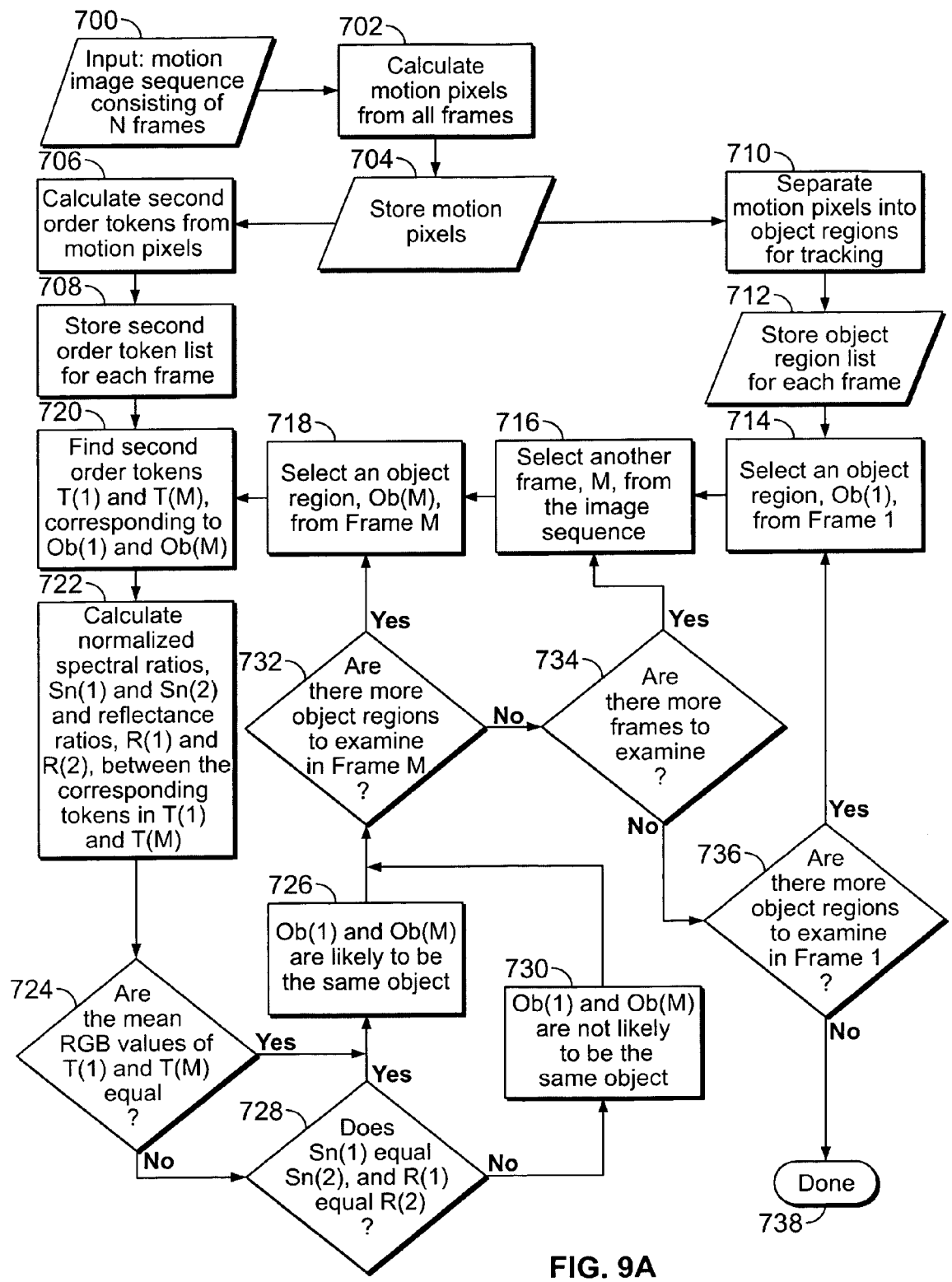
FIG. 9a is a flow chart for using second order tokens as an aid in motion object tracking, according to a feature of the present invention.

FIG. 9a is a flow chart for using second order tokens as an aid in motion object tracking, for example, the two disks of FIGS. 8a,b, according to a feature of the present invention. By comparing the spectral ratios of the second order tokens found on the disks as they move from light to dark, it can be determined with a high degree of certainty which disk has moved where. The routine of FIG. 4a, for example, can be executed to identify objects, the routine of FIG. 9a is then used to track movement of the identified objects In step 700, an input to the CPU 12 comprises a motion image sequence of N frames, for example, the frames depicted in FIGS. 8a,b. In step 702, the CPU 12 calculates motion pixels from all frames. The calculation is completed by classifying pixels of the images utilizing, for example, the routine of one of FIG. 4a or 7. In step 704, the CPU 12 stores all of the motion pixels, i.e., in our example, all pixels associated with disk 1 and disk 2.

Upon storing of the motion pixels, the CPU 12 executes two sub-routines. In a first sub-routine, the CPU 12 calculates second order tokens from the stored motion pixels (step 706). The second order tokens will be used to analyze objects in the sequence of frames to determine the positions of each object (disk 1 and disk 2) throughout the sequence of frames.

An Nth order token is a set of N first order uniform tokens that are different colors, as measured in a selected color space, for example, RGB, hue or chromaticity, and are near to one another in the image. As an example, disk 1 and disk 2 of FIGS. 8a,b, each comprise two distinct materials. Each material of each disk will form a uniform token, and the adjacent materials of each disk could form a second-order token, two close uniform tokens.

Figure 9B:
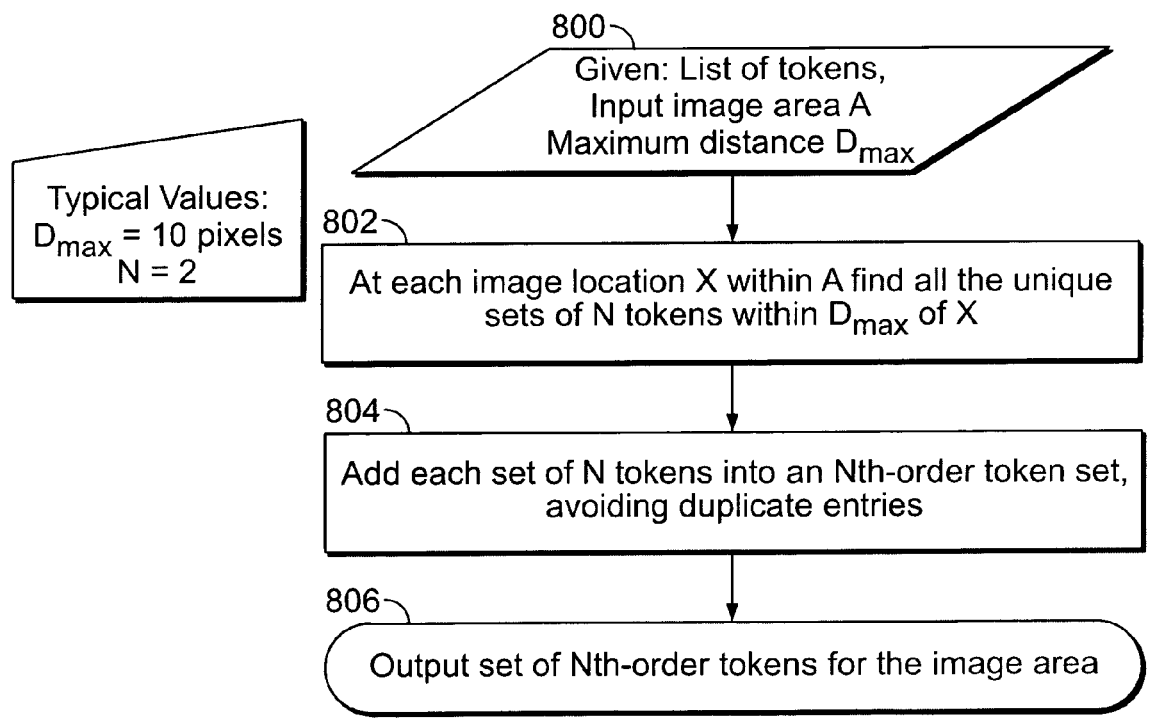

FIG. 9b shows a flow chart of a method for creating an Nth order token. The CPU 12 is given a list of tokens, for example, as identified through execution of the routine of FIG. 4b for each frame of the sequence, an input image area A and a maximum distance $D_{max}$, which could be set at 10 pixels (step 800). In step 802, the CPU 12, for each first order token within the image area A, selects an image location or pixel X=p(i, j) and then finds all unique sets of N tokens, that is, for example, all tokens of different color, withing $D_{max}$ of each location X. In step 804, the CPU 12 adds each set of N tokens found in step 802, into an Nth order token set, checking for duplicates. In step 806, the CPU 12 outputs the Nth order token sets for the image area. The CPU 12 repeats the routine for each frame of the sequence for a complete list of Nth order tokens.

Returning to FIG. 9a, the CPU 12 stores the second order token list for each frame of the sequence (step 708). In the second sub-routine, the CPU 12 separates all of the stored motion pixels into object regions for tracking (step 710). In our example, the regions comprise the pixels defining each of disk 1 and disk 2. The CPU 12 stores the region list (step 712) and then selects an object region from the list, Ob(1), from frame 1 (for example the image of FIG. 8a) of the sequence (step 714). In step 716, the CPU 12 selects another frame, M (for example the image of FIG. 8b), from the sequence. In step 718, the CPU 12 selects an object region Ob(M), from the frame M.

In step 720, the CPU 12 finds second order tokens T(1) and T(M) from the token list, that correspond to the object regions Ob(1) and Ob(M), for example, executing a pixel location comparison. In step 722, the CPU 12 calculates normalized spectral ratios, Sn(1) and Sn(2), respectively, and reflectance ratios, R(1) and R(2), respectively, between corresponding tokens of each of the second order tokens, T(1) and T(M). In performance of the calculations, the CPU 12 first determines the second order token having the brighter pixels. The mean average RGB values for the pixels of each of the two tokens of the brighter second order token are denoted as B1 and B2, respectively, while the average RGB values for the pixels of each of the two tokens of the darker second order token are denoted as D1 and D2, respectively.

A calculation of the reflectance ratios between the two pairs of tokens comprising the second order tokens, T(1) and T(M), is completed according to the formulas:

$R(1)=(B1-D1)/(B1+D1)$ $R(2)=(B2-D2)/(B2+D2)$.

A calculation of the normalized spectral ratios between the two pairs of tokens comprising the second order tokens, T(1) and T(M), is completed according to the formulas:

$Sn(1)=Norm(D1/(B1-D1))$ $Sn(2)=Norm(D2/(B2-D2))$.

In step 724, the CPU 12 determines whether the mean average RGB values of T(1) and T(M) are equal. If yes, the CPU proceeds to step 726 and classifies the object regions Ob(1) and Ob(M) as likely to be the same object. If no, the CPU 12 proceeds to step 728 to determine whether Sn(1)=Sn(2) and R(1)=R(2). If yes, the CPU 12 proceeds to step 726, discussed above. In no, the CPU 12 proceeds to step 730 and classifies the objects as not the same. In an alternative embodiment of the present invention, step 724 can be performed before calculation of the spectral and reflectance ratios, and those calculations are made only if the mean average values are not equal.

From either steps 726 or 730, the CPU 12 stores the classification and proceeds to a decision block (step 732). At the decision block of step 732, the CPU 12 determines whether there are any more object regions in frame M for examination and classification. If yes, the CPU returns to step 718 to select another object region Ob(M). If no, the CPU 12 proceeds to a decision block (step 734). In the decision block of step 734, the CPU 12 determines whether there are any more frames in the sequence N to examine. If yes, the CPU 12 returns to step 716 to select another frame M. If no, the CPU 12 proceeds to a decision block (step 736). In the decision block of step 736, the CPU 12 determines whether there are any more objects to be examined in frame 1. If yes, the CPU 12 returns to step 716 to select another object, Ob(1). If no, the routine is complete, and the CPU 12 exits the routine (step 738).

Figure 10A:
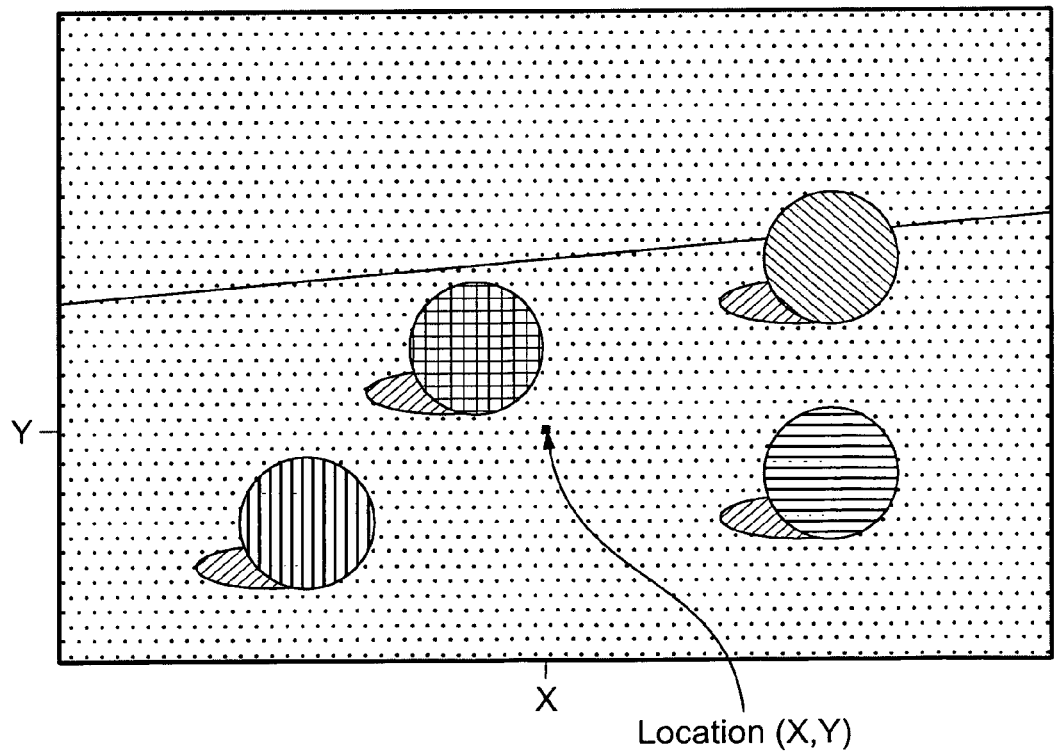
FIGS. 10a-d depict a sample image sequence showing four objects moving randomly across a scene under bi-illuminant conditions.
Figure 10B:
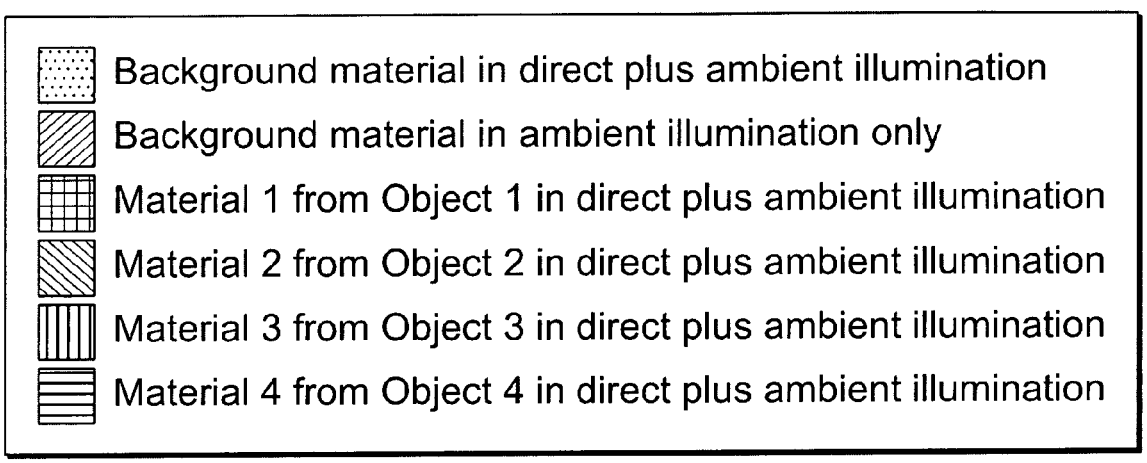
Figure 10B:
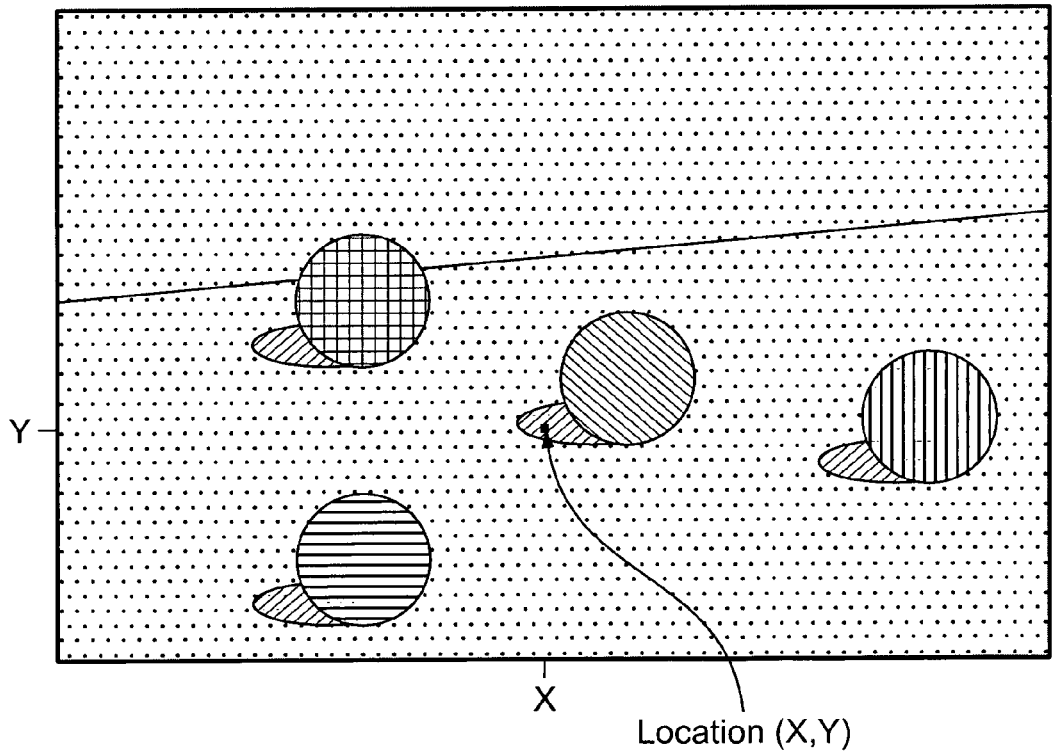
Figure 10C:
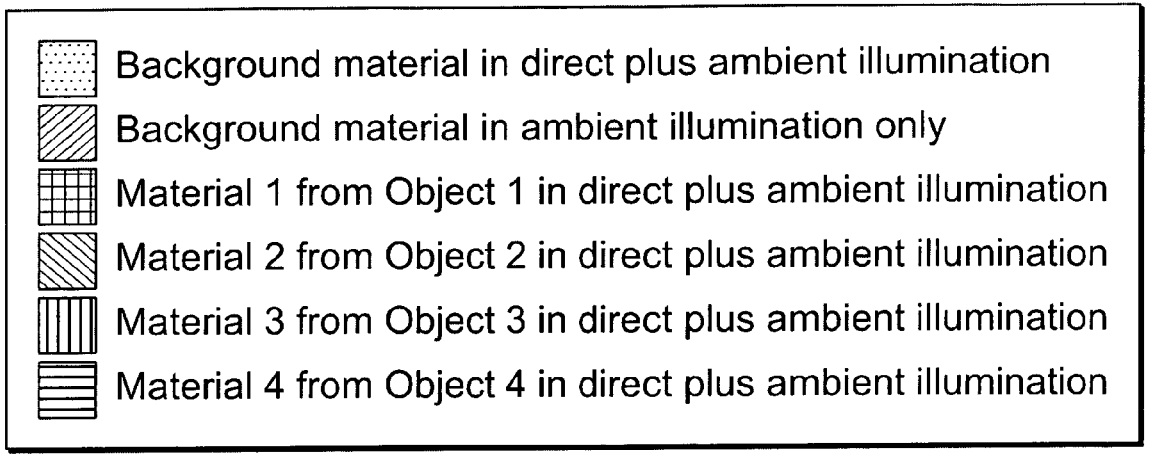
Figure 10C:
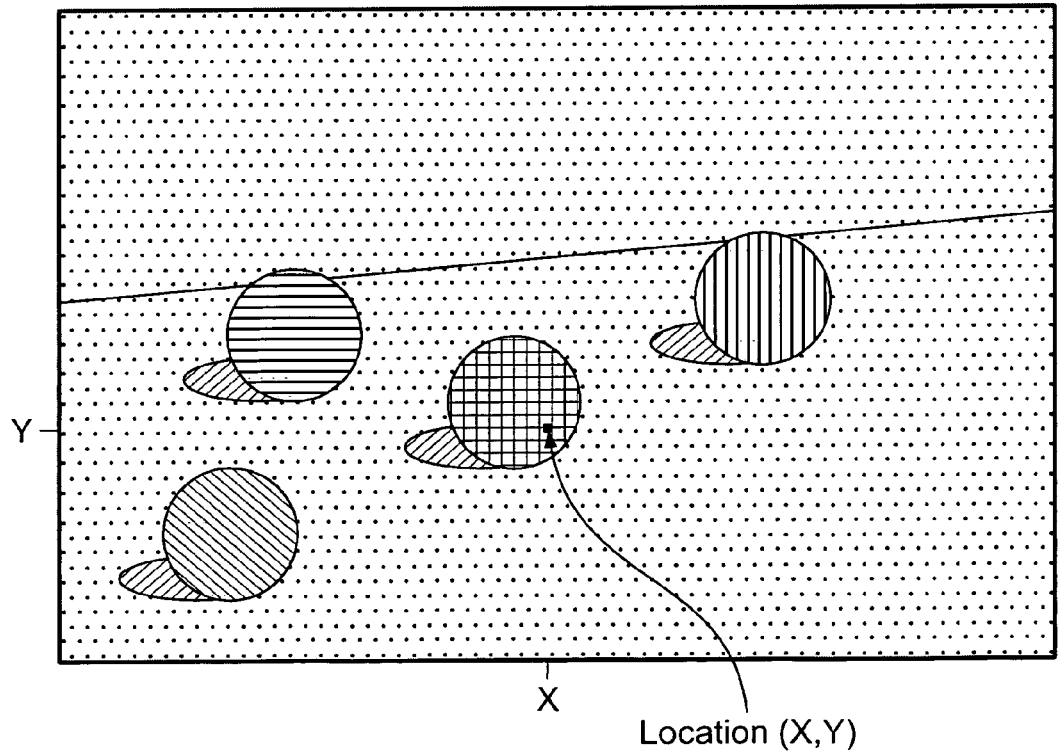
Figure 10D:
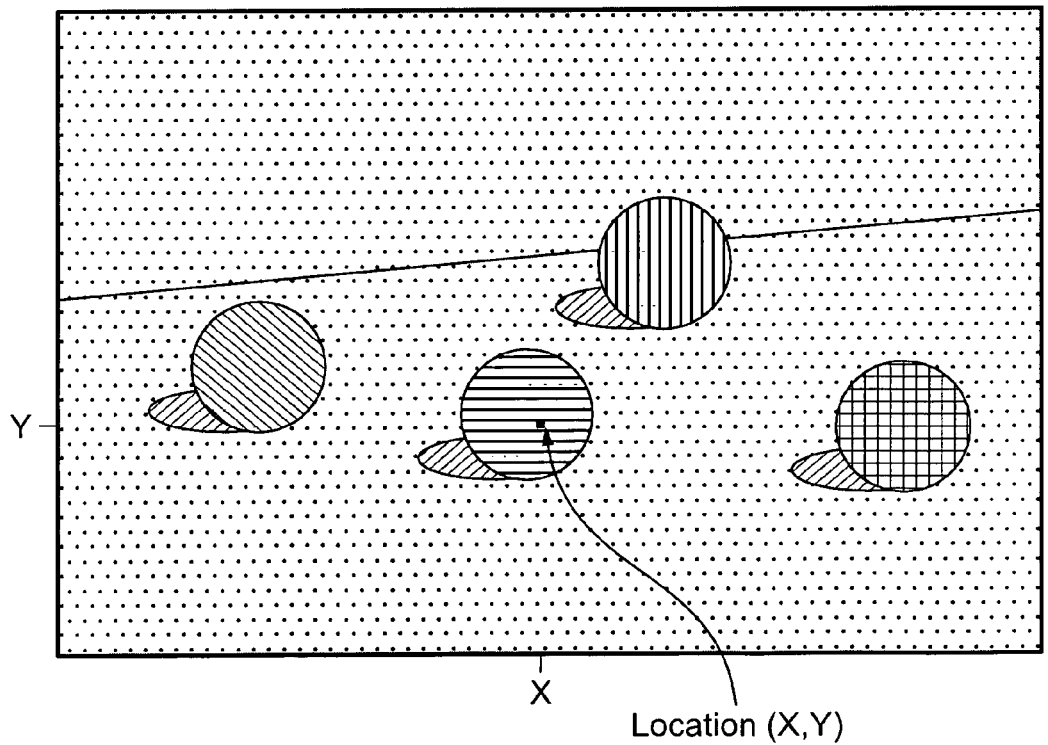

FIGS. 10a-d depict a sample image sequence in time, showing four objects moving randomly across a scene under bi-illuminant conditions. Each object is composed of a different material, and casts a shadow on the background of the image. A situation such as shown in FIGS. 10a-d can be analyzed using an enhanced Gaussian mixture model. In FIG. 10a, a location(X, Y), at a first time frame, is a pixel in the static background of the scene illuminated by an incident illuminant and an ambient illuminant, and corresponds to a most common state for a pixel. In FIG. 10b, the location(X, Y), at a second time frame, is in a shadow, illuminated by the ambient illuminant. This corresponds to a second most common state. In FIG. 10c, the location(X, Y) is covered by one of the objects, an unlikely state for the pixel. Finally, in FIG. 10d, the location(X, Y) is covered by another of the objects, also an unlikely state for the pixel.

Figure 11:
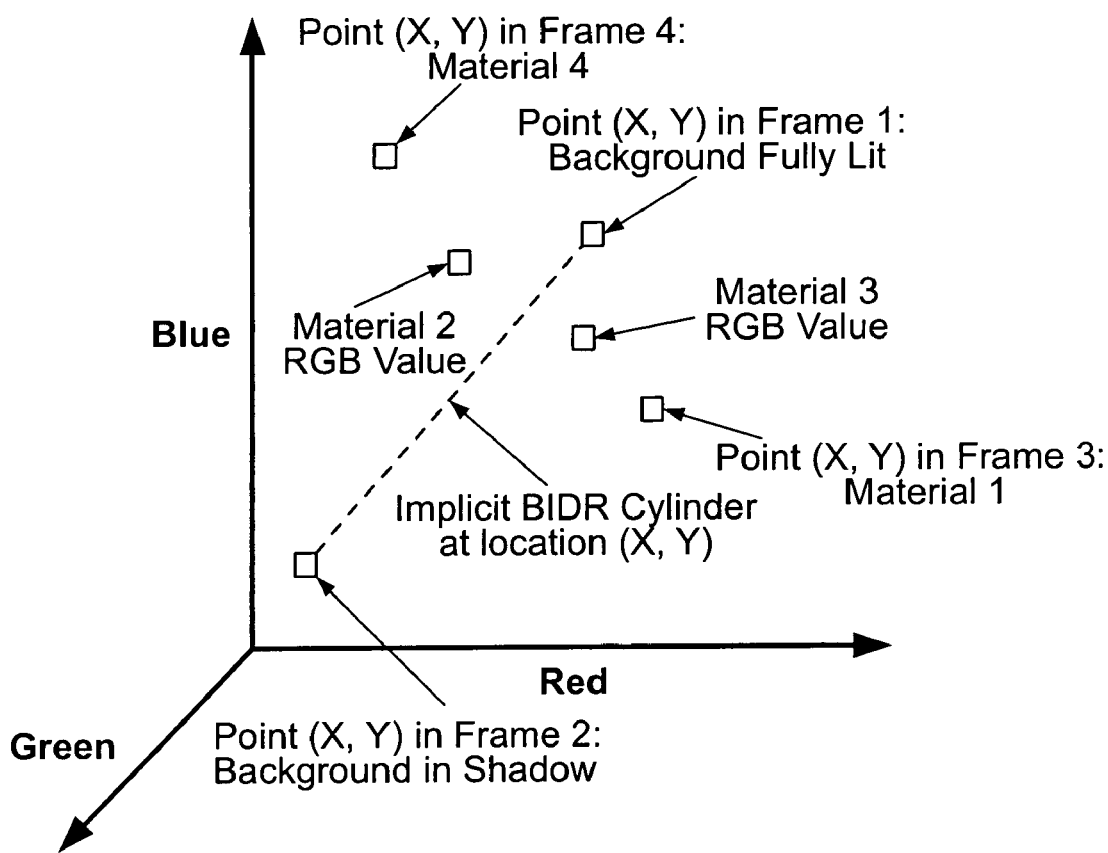
FIG. 11 is a graph showing a representation of a Gaussian mixture model in a linear RGB space.

FIG. 11 is a graph showing a representation of a Gaussian mixture model in a linear RGB space, including values corresponding to the location(X, Y), in each of the frames depicted in FIGS. 10a-d. In a Gaussian mixture model, each pixel of the image sequence will be in a set of states, and the model is used to determine a most common state and a second most common state for each pixel location, as will appear. As noted above, the most common state for the pixel at location (X, Y) will correspond to the static background, while illuminated by an incident illuminant and an ambient illuminant (FIG. 10a). The static background is typically obscured briefly by moving objects, and is otherwise constant, making this state dominant. The second most common state for the pixel is depicted in FIG. 10b, a shadow illuminated by the ambient illuminant. The second most common state is the shadowed background image. All moving objects cast a similar shadow, so this state appears as the next most common when objects are moving around a scene. The least common states correspond to object surfaces, moving through the static background. Moving objects can be made of many different materials, all of which appear briefly at a particular location, so none of the particular materials has a chance to become a common state. In FIG. 11, a line is drawn between the two most common states (from location(X, Y) in FIG. 10a, to location(X,Y) in FIG. 10b). The line is used to define a BIDR cylinder for the sequence of frames N depicted in FIGS. 10a-d. As can be seen in FIG. 11, the RGB values for the location(X, Y) when covered by one of the objects, is outside the BIDR cylinder.

Figure 12:
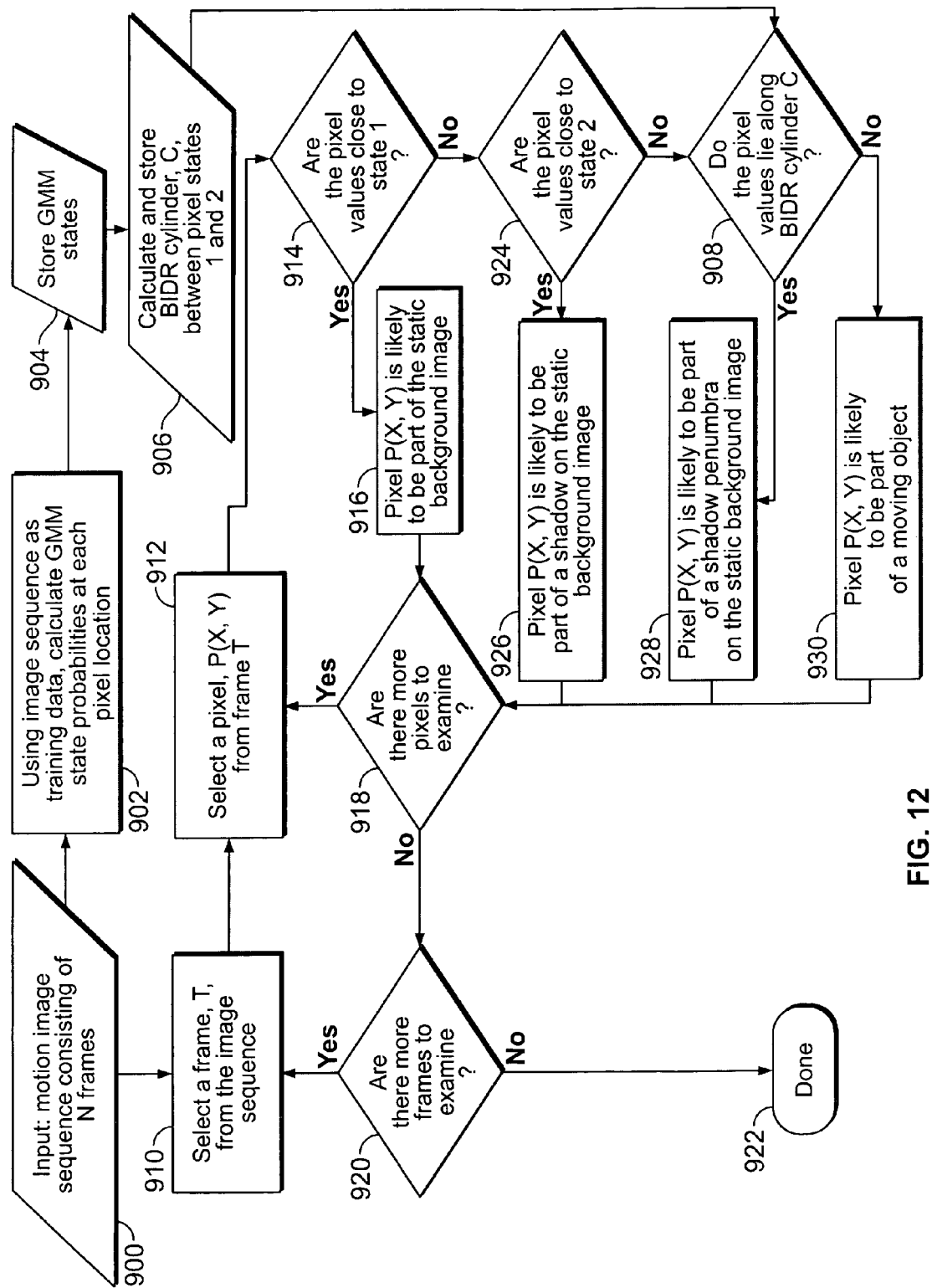
FIG. 12 is a flow chart for classifying pixels in a motion image sequence via an enhanced Gaussian mixture model, according to a feature of the present invention.

FIG. 12 is a flow chart for classifying pixels in a motion image sequence via an enhanced Gaussian mixture model, according to a feature of the present invention. In step 900, an input to the CPU 12 comprises a motion image sequence of N frames, for example, the frames depicted in FIGS. 10a-d. In a first sub-routine, in step 902, the CPU 12 calculates Gaussian probabilities at each pixel location among the sequence of images, N. The CPU 12 then stores the calculated probabilities (step 904). For a description of the Gaussian mixture model, reference can be made to C. Stauffer and W. Grimson "Adaptive background mixture models for real time tracking," Proceedings of the IEEE International Conference on CVPR, Vol. 2, pp. 246-252, June, 1999.

In step 906, the CPU 12 calculates and stores a BIDR cylinder C for each pixel location, setting the ends of the cylinder to the RGB values corresponding to the first and second most probable pixel states for that location. As should be understood, the most common state for a pixel corresponds to the static background, while illuminated by an incident illuminant and an ambient illuminant and the second most common state for the pixel corresponds to a shadow illuminated by the ambient illuminant. The BIDR cylinder can be validated by applying constraints to the BIDR cylinder derived from the two most probable pixel states, by, for example, requiring certain reasonable constraints for the illuminants. The stored BIDR cylinders are made available at a decision block (step 908).

In a second sub-routine, the CPU 12 selects a frame T from the images of the sequence N (step 910). In step 912, the CPU 12 selects a pixel P(X, Y) from the image T, and proceeds to a decision block (Step 914). In the decision block of step 914, the CPU 12 determines whether the pixel P(X, Y) is close in value, within some measure of noise, to the value of probability state 1 (the most common state). If yes, the Gaussian probability indicates that the pixel P(X, Y) is to be classified as part of the static background of the scene (step 916). The CPU 12 then proceeds to a decision block (step 918). In the decision block of step 918, the CPU 12 determines whether there are any more pixels in the frame T for analysis and classification. If yes, the CPU returns to step 912. If no, the CPU 12 proceeds to a decision block (step 920). In the decision block of step 920, the CPU 12 determines whether there are any more frames in the sequence N for analysis. If yes, the CPU 12 returns to step 910. If no, the routine is ended (step 922).

If the determination of step 914 is no, the CPU 12 proceeds to a decision block (step 924). In the decision block of step 924, the CPU 12 determines whether the pixel P(X,Y) is close in value, within some measure of noise, to the value of probability state 2 (the second most common state). If yes, the Gaussian probability indicates that the pixel P(X, Y) is to be classified as within a shadow of the static background (step 926). The CPU 12 then proceeds to the decision block of step 918. If no, the CPU 12 proceeds to the decision block of step 908. In the decision block of step 908, the CPU 12 determines whether the pixel P(X, Y) lies within the BIDR cylinder for the corresponding location of the subject pixel P(X,Y). If yes, the Gaussian probability indicates that the pixel P(X, Y) is to be classified as within a shadow penumbra of the static background (step 928). If no, the Gaussian probability indicates that the pixel P(X, Y) is to be classified as part of a transient object distinct from the background. From either steps 928 or 930, the CPU 12 proceeds to the decision block of step 918.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for classifying pixel values in a motion sequence of images, comprising the steps of:
   a computer executing the following steps:
   determining spectral information relevant to the sequence of images, the spectral information including a characteristic spectral ratio for the background; and
   utilizing the spectral information to classify a pixel as one of background, shadow and object.

2. The method of claim 1, wherein the step of utilizing the spectral information to classify a pixel as one of background, shadow and object is carried out by:
   determining a characteristic spectral ratio for a static background of the sequence of images;
   calculating, for a subject pixel of an image in the sequence, a spectral ratio between the subject pixel and a corresponding pixel of the static background; and
   comparing the spectral ratio for the subject pixel to the characteristic spectral ratio.

3. The method of claim 2, wherein the spectral ratio for the subject pixel is a normalized spectral ratio.

4. A computer system comprising:
   a CPU; and
   a memory storing a sequence of images;
   the CPU arranged and configured to execute a routine to determine spectral information relevant to the sequence of images, wherein the spectral information comprises a characteristic spectral ratio for the background, and utilize the spectral information to classify a pixel as one of background, shadow and object.

5. An automated, computerized method for classifying pixel values in a motion sequence of images, comprising the steps of:
   a computer executing the following steps:
   determining spectral information relevant to the sequence of images, the spectral information including a BIDR cylinder representation of pixel values, in a color space; and
   utilizing the spectral information to classify a pixel as one of background, shadow and object.

6. The method of claim 5, wherein the step of utilizing the spectral information to classify a pixel as one of background, shadow and object is carried out by:
   generating a BIDR cylinder representative of values of a subject pixel location throughout the sequence of images; and
   comparing a value of the subject pixel location in one image, to the BIDR cylinder.

7. The method of claim 5, wherein the color space is an RGB space.

8. The method of claim 6, wherein the BIDR cylinder representative of values of a subject pixel location throughout the sequence of images, comprises a temporal linear token of pixel values at the location.

9. The method of claim 6, wherein the step of generating a BIDR cylinder representative of values a subject pixel location throughout the sequence of images is carried out by calculating state probabilities for pixel values at the subject pixel location, and generating the BIDR cylinder representation as a function of the state probabilities.

10. The method of claim 9, wherein the step of calculating state probabilities for pixel values at the subject pixel location is carried out by utilizing a Gaussian mixture model.

11. A computer system comprising:
    a CPU; and
    a memory storing a sequence of images;
    the CPU arranged and configured to execute a routine to determine spectral information relevant to the sequence of images, wherein the spectral information comprises a BIDR cylinder representation of pixel values, in a color space, and utilize the spectral information to classify a pixel as one of background, shadow and object.

12. A computer program product, disposed on a computer readable media, the product including computer executable process steps operable to control a computer to:
    provide a sequence of image files, each depicting an image, in a computer memory;
    determine spectral information relevant to the sequence of images, wherein the spectral information comprises a characteristic spectral ratio for the background; and
    utilize the spectral information to classify a pixel as one of background, shadow and object.

13. A computer program product, disposed on a computer readable media, the product including computer executable process steps operable to control a computer to:
    provide a sequence of image files, each depicting an image, in a computer memory;
    determine spectral information relevant to the sequence of images, wherein the spectral information comprises a BIDR cylinder representation of pixel values, in a color space; and
    utilize the spectral information to classify a pixel as one of background, shadow and object.

* * * * *